US012769754B2

(12) United States Patent
Waller et al.

(10) Patent No.: US 12,769,754 B2
(45) Date of Patent: Oct. 20, 2026

(54) CLOUD-BASED DATA MANAGEMENT FOR DATA FILES

(71) Applicants: Marquis G. Waller, Beverly, OH (US); Jeffrey Alan Sikkink, Longmont, CO (US); Ryszard Ligas, Boulder, CO (US); Amber Joy Watkins, Longmont, CO (US)

(72) Inventors: Marquis G. Waller, Beverly, OH (US); Jeffrey Alan Sikkink, Longmont, CO (US); Ryszard Ligas, Boulder, CO (US); Amber Joy Watkins, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 63 days.

(21) Appl. No.: 18/116,926

(22) Filed: Mar. 3, 2023

(65) Prior Publication Data

US 2024/0296168 A1 Sep. 5, 2024

(51) Int. Cl.
*G06F 16/25* (2019.01)
*G06F 16/11* (2019.01)
*H04L 67/1097* (2022.01)

(52) U.S. Cl.
CPC .......... *G06F 16/254* (2019.01); *G06F 16/116* (2019.01); *H04L 67/1097* (2013.01)

(58) Field of Classification Search
CPC ... G06F 16/254; G06F 16/116; H04L 67/1097
USPC .......................................................... 707/602
See application file for complete search history.

(56) References Cited

U.S. PATENT DOCUMENTS

| | | | |
|---|---|---|---|
| 10,983,967 B2 | 4/2021 | Tsirogiannis et al. | |
| 11,138,220 B2 | 10/2021 | Shah et al. | |
| 2011/0055559 A1* | 3/2011 | Li | G06F 21/6218 380/259 |
| 2015/0331909 A1 | 11/2015 | Sundquist et al. | |
| 2016/0188594 A1 | 6/2016 | Ranganathan | |
| 2018/0150529 A1* | 5/2018 | Mcpherson | G06F 9/542 |
| 2018/0253477 A1 | 9/2018 | Schoueri et al. | |
| 2020/0242135 A1 | 7/2020 | Shah et al. | |
| 2020/0334247 A1 | 10/2020 | Kornacker et al. | |
| 2020/0344299 A1* | 10/2020 | Sohail | H04L 47/821 |
| 2020/0377233 A1* | 12/2020 | Harvey | G01N 21/9515 |
| 2021/0117417 A1* | 4/2021 | Hendrickson | G06F 16/90 |
| 2022/0245033 A1* | 8/2022 | Zou | G06F 11/1464 |
| 2022/0374519 A1* | 11/2022 | Botelho | G06F 11/1464 |

(Continued)

OTHER PUBLICATIONS

Adding Classifiers to a Crawler; AWS Glue; https://docs.aws.amazon.com/glue/latest Dec. 17, 2021.

(Continued)

*Primary Examiner* — Mohammad Ali
(74) *Attorney, Agent, or Firm* — Duft & Bornsen, PC

(57) ABSTRACT

System, method, and software of implementing a data management service on a cloud computing platform. In an embodiment, a system extracts a data file in a row-based file format from a cloud-based storage resource, extracts a schema associated with the data file from the cloud-based storage resource, transforms the data file in the row-based file format into a columnar file format based on the schema, and loads the data file in the columnar file format to a cloud-based centralized repository.

20 Claims, 18 Drawing Sheets

(56) References Cited

U.S. PATENT DOCUMENTS

2023/0142346 A1* 5/2023 Menezes ............ G06F 11/1451
711/162

OTHER PUBLICATIONS

Classifier—AWS Glue; https://docs.aws.amazon.com/glue/latest/webapi/API_Clissifier.html; Dec. 17, 2021.
Dr. Abdullah Alger; How to Convert CSV Objects to Parquet in Cloud Object Storage; https://www.ibm.com/cloud/blog; Dec. 17, 2021.
How to convert the CSV file to the Avro Parquet and JSON files in Apache Spark; https://www.projectpro.io/recipes Dec. 17, 2021.
Import from CSV options—IBM Documentation; https://www.ibm.com/docs/; Dec. 17, 2021.
Preetdeep Kumar; How to transform CSV to Paruet using AWS Glue; https:/techwithcloud.com; Dec. 17, 2021.
Understanding the Data Format for Amazon ML; https://docs.aws.amazon.com/machine-learning/latest/dg; Dec. 17, 2021.
Anonymous; Storage Best Practices for Data and Analytics Applications; AWS Whitepaper; Apr. 6, 2022 XP055976516.
European Search Report; Application EP24159698; Jul. 18, 2024.

* cited by examiner

CLOUD-BASED DATA MANAGEMENT FOR DATA FILES

TECHNICAL FIELD

The following disclosure relates to the field of cloud computing, and more particularly, to data management on a cloud computing platform.

BACKGROUND

Organizations may need to transfer data from legacy data storages to the cloud for larger consumption and usage. In some cases, a legacy data storage supports row-based file formats, and data files are exported to the cloud in the row-based file format. However, data analysis on files in a row-based file format may not be as efficient as other file formats.

SUMMARY

Embodiments described herein are a data management system and associated methods configured to handle or process data files in row-based file formats. A data management system as described herein is configured to ingest a data file in a row-based file format to a cloud computing platform, along with an associated schema for the data file. The data management system is further configured to transform the data file to a columnar file format using the schema uploaded with the data file. A technical benefit is the data file in columnar file format may be more efficiently analyzed by data analysis tools on the cloud computing platform.

In an embodiment, a data management system comprises processing resources and storage resources provisioned on a cloud computing platform to implement a data management service. The processing resources are configured to cause the data management system at least to receive a first Application Programming Interface (API) request from a client application to store a data file in a row-based file format, and process a first request body of the first API request to identify a schema associated with the data file. The schema indicates column information to construct one or more columns from data in the data file. The processing resources are configured to further cause the data management system at least to identify a cloud-based storage resource on the cloud computing platform to store the data file, transmit an API response to the client application with a resource identifier of the cloud-based storage resource, receive a second API request from the client application to store the data file at the cloud-based storage resource, process a second request body of the second API request to identify the data file, and store the data file and the schema at the cloud-based storage resource.

In an embodiment, a data management system comprises processing resources and storage resources provisioned on a cloud computing platform to implement a data management service. The processing resources are configured to cause the data management system at least to extract a data file in a row-based file format from a cloud-based storage resource, and extract a schema associated with the data file from the cloud-based storage resource. The schema indicates column information to construct one or more columns from data in the data file. The processing resources are configured to further cause the data management system at least to transform the data file in the row-based file format into a columnar file format based on the schema, and load the data file in the columnar file format to a cloud-based centralized repository.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
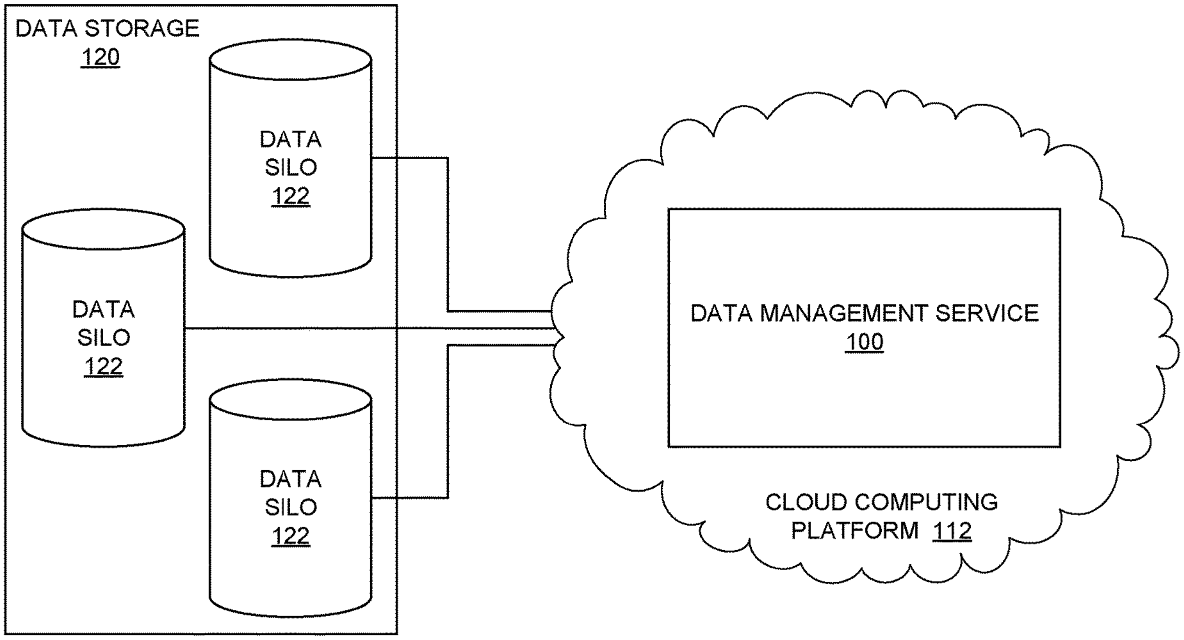
FIG. 1 illustrates a cloud-based data management service in an illustrative embodiment.

FIG. 1 illustrates a cloud-based data management service 100 in an illustrative embodiment. A data management service 100 is a type of service that uploads data from one or more data sources, transforms the data, and/or stores the data in a centralized repository. Data management service 100 may also analyze the data in the centralized repository, and/or perform other functions regarding the data. In this embodiment, data management service 100 is implemented on a cloud computing platform 112. Cloud computing is the delivery of computing resources, including storage, processing power, databases, networking, analytics, artificial intelligence, and software applications, over an internet connection. Some examples of cloud computing platform 112 may comprise Amazon Web Services (AWS), Google Cloud, Microsoft Azure, etc. Technical benefits of a cloud computing platform 112 are little or no upfront costs, high levels of security, and scalability for implementing data management service 100.

An organization, such as a company, health care organization, educational organization, governmental organization, etc., may generate and/or collect a large volume of data that is stored in data storage 120. Often times the data is stored in data silos 122, which are data repositories controlled by one department, business unit, etc., typically isolated from the rest of the organization. To derive valuable insights and get a holistic view of the data, the organization may desire that the data be merged into a centralized repository. Thus, the organization may want to migrate the data from legacy data storage 120 to the cloud for improved consumption of the data, such as through data management service 100. As will be described in more detail below, some file formats supported by legacy data storage 120 may not be desirable for data analysis or other processing, so data management service 100 supports conversion of the data to another format when stored in a centralized repository.

Figure 2:
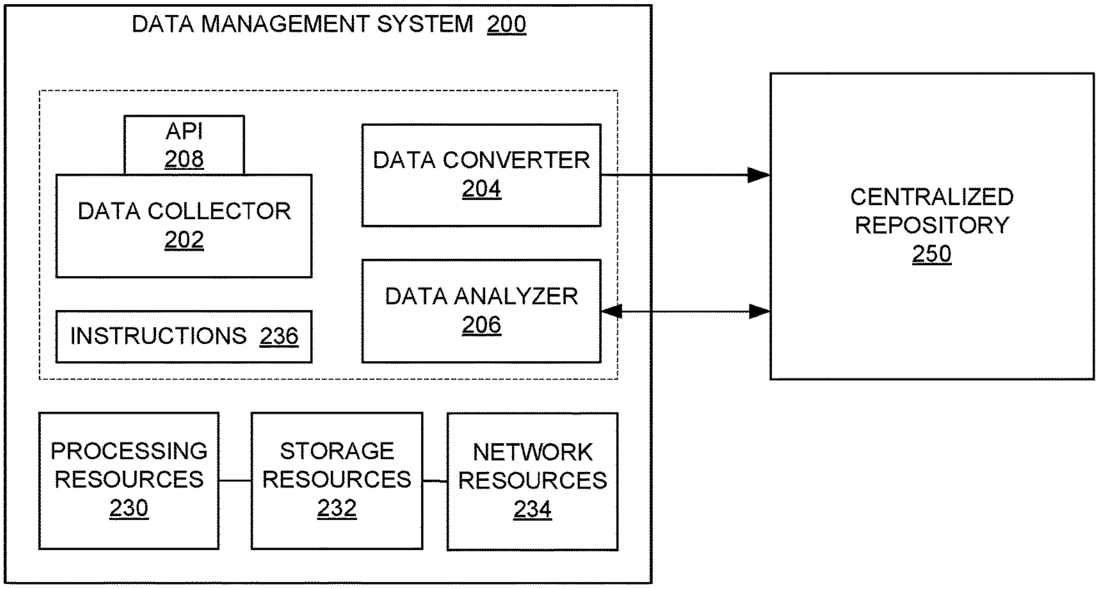
FIG. 2 is a block diagram of a data management system in an illustrative embodiment.

In an embodiment, a data management system is implemented on cloud computing platform 112 to provide the data management service 100. FIG. 2 is a block diagram of data management system 200 in an illustrative embodiment. To implement the data management system 200, cloud resources may be provisioned on cloud computing platform 112 (e.g., AWS), such as processing resources 230 (e.g., physical or hardware processors, a server, a virtual server or virtual machine (VM), a virtual central processing unit (vCPU), etc.), storage resources 232 (e.g., physical or hardware storage, virtual storage, etc.), and/or networking resources 234, although other resources are considered herein. Data management system 200 may be built upon the provisioned resources with instructions 236, programming, code, etc.

In an embodiment, data management system 200 may include or implement a data collector 202, a data converter 204, and a data analyzer 206. Data collector 202 is configured to input, upload, or ingest data for the data management service 100 from external devices or systems (e.g., legacy data storage 120 or associated controllers) over a network connection, such as by exchanging messages, files, etc. Data collector 202 may use or provide an Application Programming Interface (API) 208 to interact with client applications implemented at external systems, such as legacy data storage 120. Data collector 202 is configured to store the ingested data in cloud-based storage (e.g., storage resources 232). Operations or functions performed by data collector 202 may generally be referred to as an ingestion phase of data into data management service 100.

Data converter 204 is configured to convert or transform data files stored in cloud-based storage from a native or legacy file format to another file format, and store the data files in a cloud-based centralized repository 250 on the cloud computing platform 112. For example, a native file format supported by legacy data storage 120 may comprise a row-based file format. One example of a row-based file format is a delimited file format, which is a collection of records arranged in rows, and individual data values or fields are separated by column delimiters within the rows. One example of a delimited file format is a comma-separated values (CSV) file format, which is a row-based file format where individual data values or fields are separated by commas within the rows. A row-based file format, such as CSV, may provide a challenge for data analysis or other data processing as column information for the data in the file may not be reasonably identifiable. Thus, data converter 204 is configured to convert or transform data files in a row-based file format to a columnar file format or column-based file format. In a columnar file format, data is stored by column instead of by row. Examples of columnar file formats are Apache Parquet (referred to generally herein as Parquet), Optimized Row Columnar (ORC), etc. In some cases, columnar file formats have become the standard in centralized repositories for fast analytics workloads as opposed to row-based file formats. Columnar file formats can significantly reduce the amount of data that needs to be fetched by accessing columns that are relevant to the workload. Operations or functions performed by data converter 204 may generally be referred to as a transformation phase of data in data management service 100.

Figure 3A:
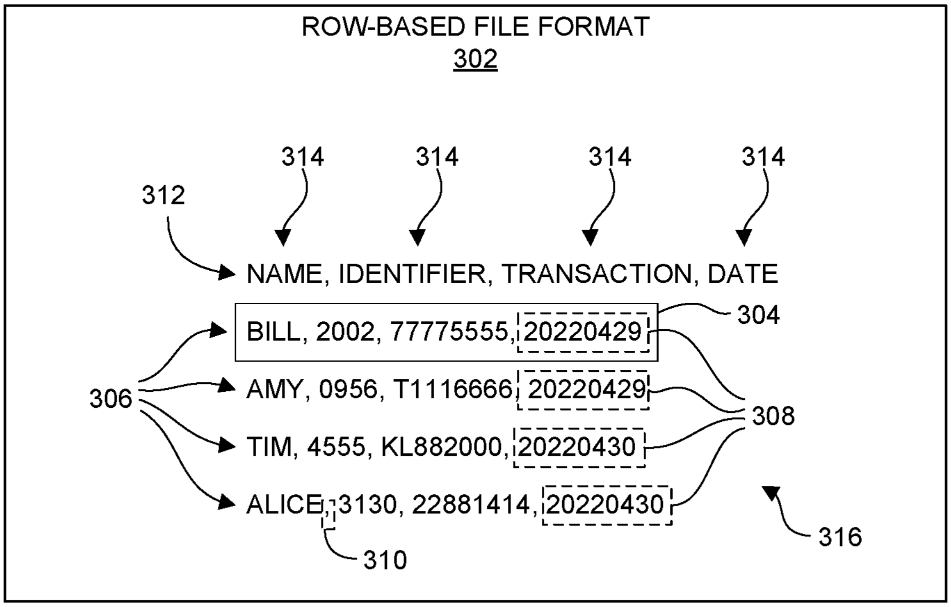
FIG. 3A illustrates a row-based file format.
Figure 3B:
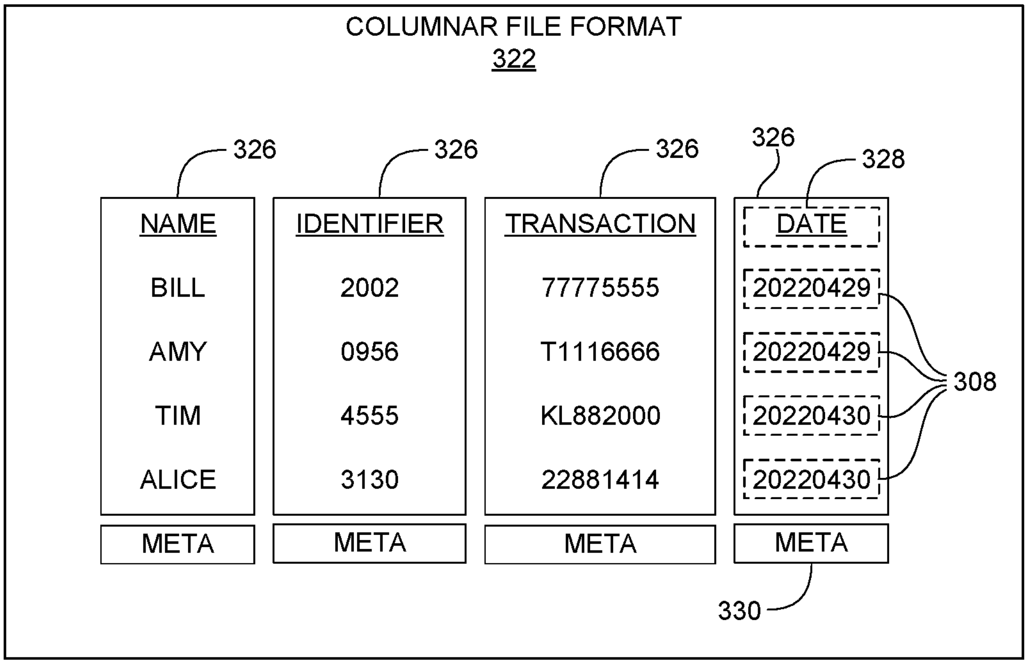
FIG. 3B illustrates a columnar file format.

FIG. 3A illustrates a row-based file format 302. In a row-based file format 302, data values for records 304 are laid out or arranged in rows 306. Each row 306 is a contiguous collection of individual data values 308 or data fields of a record 304. In an embodiment, a row-based file format 302 may comprise a delimited file format 316 where individual data values 308 are separated by column delimiters 310 (which are commas in this example). Thus, the data values 308 may be stored sequentially in a row 306, and separated by column delimiters 310. The row-based file format 302 may also provide for a header row 312 which describes headers 314 for the records 304. FIG. 3B illustrates a columnar file format 322. In a columnar file format 322, individual data values 308 are laid out or arranged in columns 326. Thus, the layout of each column 326 is a contiguous collection of data values 308 stored sequentially. Each column 326 includes a column name 328 or column identifier, and may also include associated column metadata 330, such as a data type for its associated column 326.

In FIG. 2, data analyzer 206 is configured to analyze the data in the columnar file format 322 that is stored in central repository 250. For example, data analyzer 206 may perform queries to one or more data files in columnar file format 322. Operations or functions performed by data analyzer 206 may generally be referred to as an analysis phase of data in data management service 100.

Data management system 200 may include various other components, applications, etc., not specifically illustrated in FIG. 2.

Figure 4:
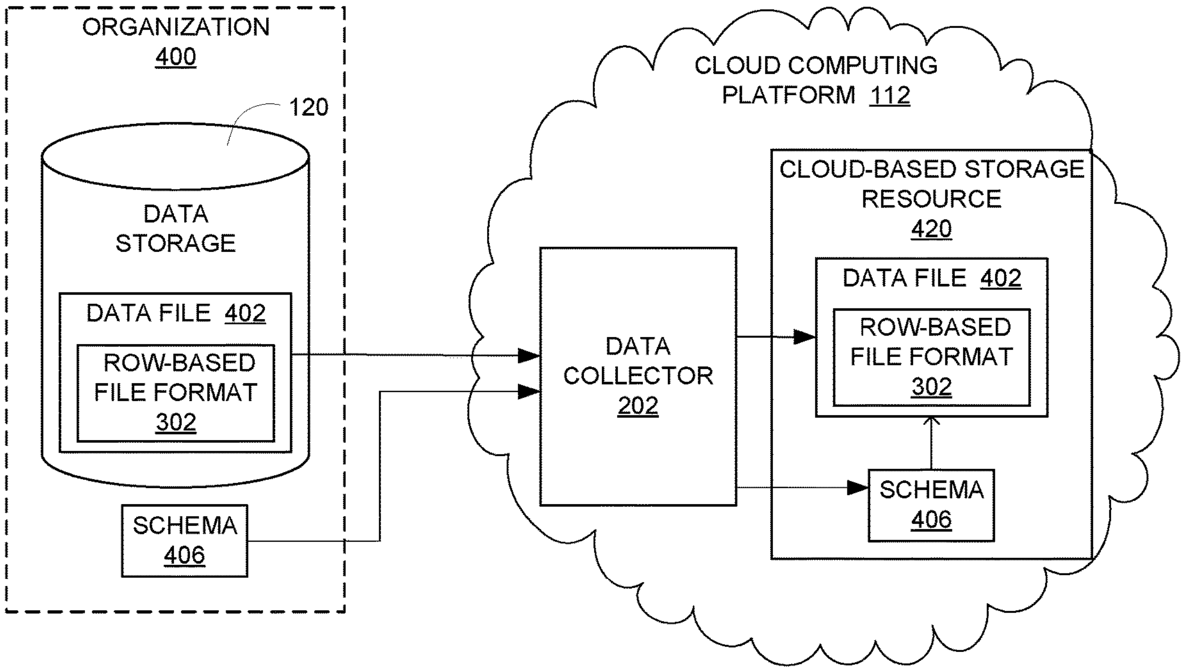
FIG. 4 illustrates an ingestion phase of data into a data management service in an illustrative embodiment.

In an embodiment, data collector 202 is configured to input or upload a schema for a data file in a row-based file format 302 during the ingestion phase. Data collector 202 stores the schema in cloud-based storage with the data file. FIG. 4 illustrates an ingestion phase of data into data management service 100 in an illustrative embodiment. In this example, data storage 120 of an organization 400 stores a data file 402 in a row-based file format 302. The organization 400 wants to migrate the data file 402 from data storage 120 to the cloud computing platform 112 through data management service 100. During the ingestion phase, data collector 202 is configured to upload or otherwise ingest the data file 402 for storage at a cloud-based storage resource 420. Cloud-based storage resource 420 is a storage location having a unique memory address, such as an Amazon S3 bucket.

Figure 5:
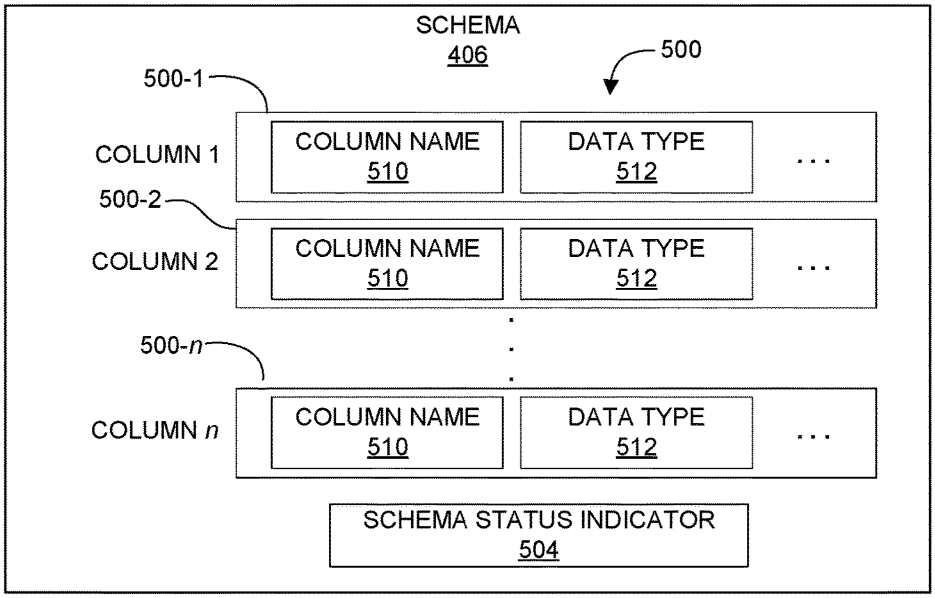
FIG. 5 illustrates a schema in an illustrative embodiment.

Further, during the ingestion phase, data collector 202 is configured to upload or otherwise ingest a schema 406 associated with the data file 402 for storage at cloud-based storage resource 420. Schema 406 may be provisioned or pre-provisioned, such as by the organization 400 (or another entity), prior to uploading the data file 402. FIG. 5 illustrates a schema 406 in an illustrative embodiment. A schema (also referred to as a schema definition or a column schema) indicates a column structure or column information to construct one or more columns from data in a data file. In other words, a schema is a blueprint or template used to construct one or more columns from data in a data file. Schema 406 includes column information 500 for one or more columns, such as columns 326 of columnar file format 322 (see FIG. 3B). For example, the column information 500 includes column information 500-1 for column 1, column information 500-2 for column 2, column information **500-*n* for column n, etc. The column information 500 for an individual column may include a column name 510, a data type 512 for the column (e.g., Boolean, integer (e.g., tiny integer, small integer, big integer), float or double, decimal, character, variable character, string, date, timestamp, etc.), and/or other information as desired. The schema 406 may also include a schema status indicator 504, which is a value, flag, or other indication of whether the schema is new, updated, etc. The schema 406 may be defined by organization 400 or another entity. Data collector 202 stores the schema 406 with the data file 402 in cloud-based storage resource 420. In an embodiment, the schema 406 is specific to the data file 402, and is connected or linked to the data file 402 as stored in cloud-based storage resource 420. For example, data collector 202 may store the schema 406 in a container with the data file 402, in the same file directory, as metadata of an S3 object, etc. One technical benefit is a schema 406 may be defined for a data file 402 indicating column information 500** for certain columns of data that are of significance to data analysis, that may be difficult to automatically determine/detect, etc.

Figure 6:
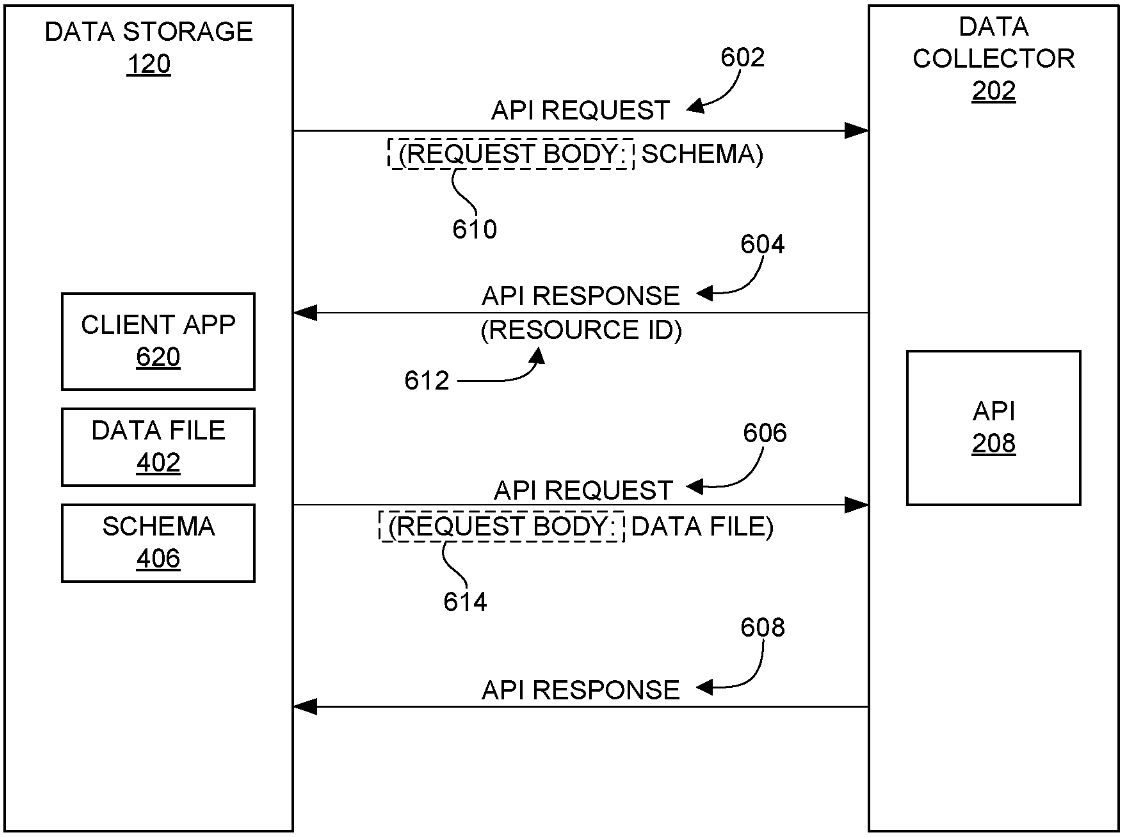
FIG. 6 illustrates an API configured to ingest a data file and an associated schema in an illustrative embodiment.

In an embodiment, an API 208 may be defined or provided to ingest data files 402, and the schemas 406 associated with the data files 402. FIG. 6 illustrates an API 208 configured to ingest a data file 402 and an associated schema 406 in an illustrative embodiment. API 208 uses API calls (e.g., API request/API response) to ingest data file 402 and the associated schema 406. An API call is a process of a client application submitting a request to an API. For example, data storage 120 (or an associated controller) may run or execute a client application 620 that generates one or more API calls as indicated in FIG. 6. In an embodiment, client application 620 transmits an API request 602 (e.g., a first API request) to data collector 202 requesting upload of a data file 402. Client application 620 includes, inserts, or passes the schema 406 associated with the data file 402 in a request body 610 of the API request 602. For example, the schema 406 may be written in JSON (JavaScript Object Notation) format, XML (Extensible markup language) format, etc., within the request body 610 of the API request 602. One technical benefit is the schema 406 is uploaded in an API call to the cloud computing platform 112 for storage with the data file 402.

Data collector 202 receives the API request 602 requesting upload of the data file 402, and processes the request body 610 of the API request 602 to identify the schema 406 associated with the data file 402. Data collector 202 provisions or identifies a cloud-based storage resource 420 on cloud computing platform 112 for the data file 402, and transmits an API response 604 (e.g., a first API response) to client application 620 with a resource identifier (ID) 612 (e.g., a Uniform Resource Identifier (URI)) of the cloud-based storage resource 420 for the data file 402. Data collector 202 may temporarily store the schema 406 associated with the data file 402.

Client application 620 receives the API response 604, and processes the API response 604 to identify the resource identifier 612 of the cloud-based storage resource 420 for the data file 402. In an embodiment, client application 620 transmits another API request 606 (e.g., a second API request) to data collector 202 requesting storage of the data file 402 at cloud-based storage resource 420. Client application 620 includes, inserts, or passes the data file 402 in a request body 614 of the API request 606, along with any other desired information. Data collector 202 receives the API request 606 requesting storage of the data file 402, and stores the data file 402 and the schema 406 at cloud-based storage resource 420. Data collector 402 may then reply with an API response 608. One technical benefit is a schema 406 is stored together with the data file 402 so that other processes may locate and access the schema 406 when processing the data file 402.

Figure 7:
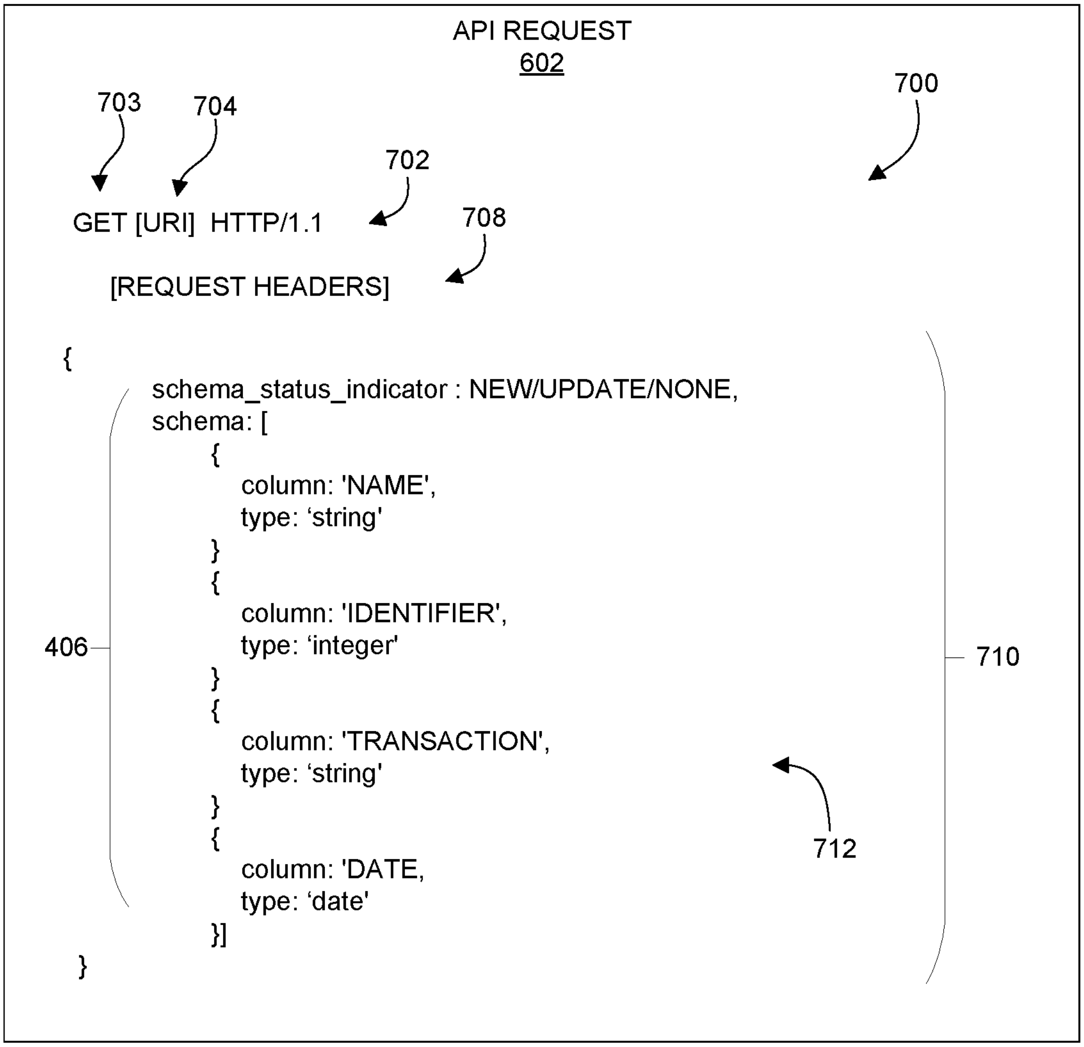
FIG. 7 illustrates an API request in an illustrative embodiment.

FIG. 7 illustrates an API request 602 in an illustrative embodiment. In this example, API request 602 comprises a Hypertext Transfer Protocol (HTTP) request 700. In general, an HTTP message comprises an HTTP Request/Response Line, an HTTP header, and HTTP Payload. Thus, HTTP request 700 includes a request line 702 that includes a method token 703 indicating an HTTP method, and a URI 704 that identifies a resource to apply the request. The HTTP request 700 further includes one or more request headers 708, and a message body 710 (also referred to as an entity body or payload). In an embodiment, the HTTP method may comprise a "GET" method requesting a resource identifier 612 (e.g., URI) of a cloud-based storage resource 420 for data file 402. Client application 620 includes or inserts the schema 406 in the message body 710 of the HTTP request 700. Message body 710 of an HTTP request 700 is an example of a request body 610 of an API request 602. In this example, the schema 406 passed in the message body 710 is in JSON format 712, and describes column information 500 for four columns of data, as an example. The schema 406 includes a column name 510 (i.e., "NAME", "IDENTIFIER", "TRANSACTION", and "DATE") and an associated a data type 512 (e.g., "string", "integer", "string", and "date") for each column. It is noted that the schema 406 indicated in FIG. 7 is merely an example, and other schemas are considered herein.

Figure 8:
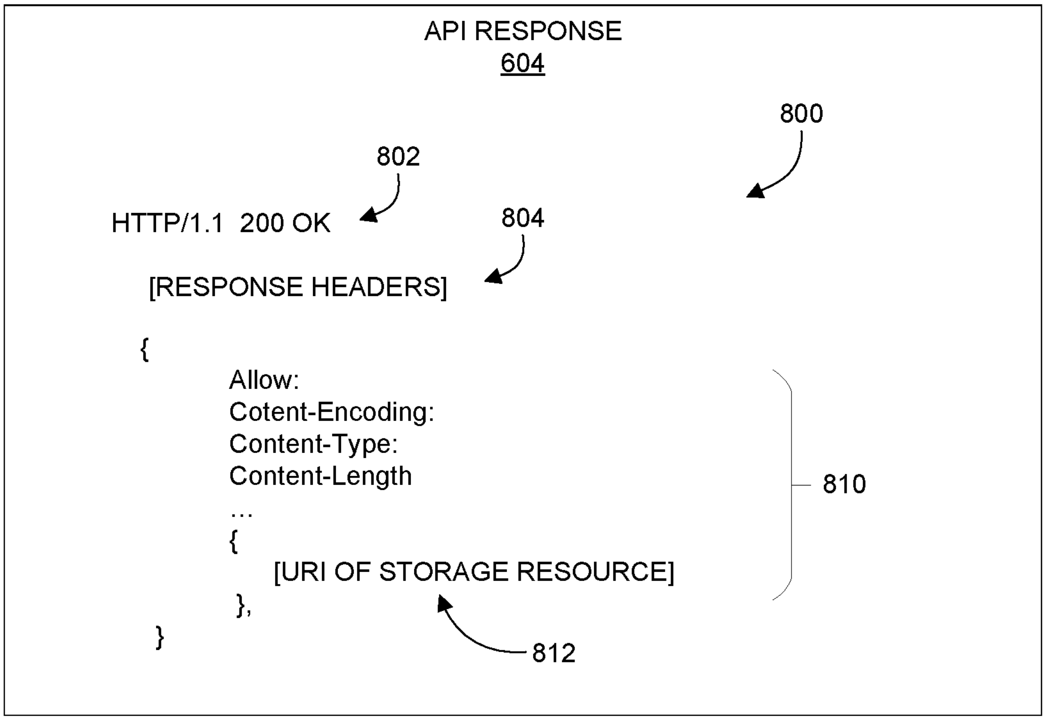
FIG. 8 illustrates an API response in an illustrative embodiment.

FIG. 8 illustrates an API response 604 in an illustrative embodiment. In this example, API response 604 comprises an HTTP response 800. In general, HTTP response 800 includes a status line 802 that includes a status code (e.g., 200 OK), response headers 804, and a message body 810. In an embodiment, data collector 202 may include or insert a URI 812 of cloud-based storage resource 420 in the message body 810 of the HTTP response 800.

Figure 9:
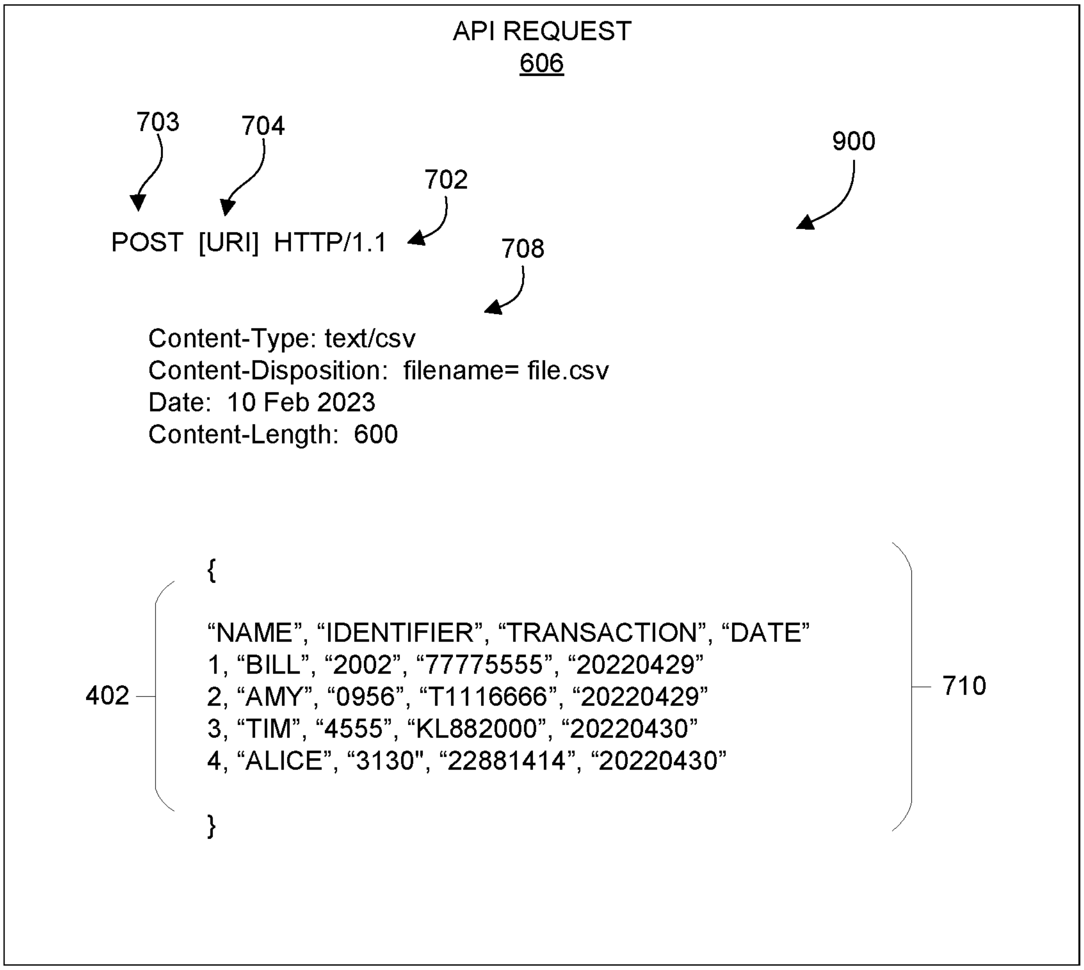
FIG. 9 illustrates an API request in an illustrative embodiment.

FIG. 9 illustrates an API request 606 in an illustrative embodiment. In this example, API request 606 comprises an HTTP request 900. In an embodiment, the HTTP method may comprise a "POST" method requesting storage of the data file 402. Client application 620 includes or inserts the data file 402 in the message body 710 of the HTTP request 900. Message body 710 of an HTTP request 900 is an example of a request body 614 of an API call 606. It is noted that the data file 402 indicated in FIG. 9 is merely an example, and other data files are considered herein.

Figure 10:
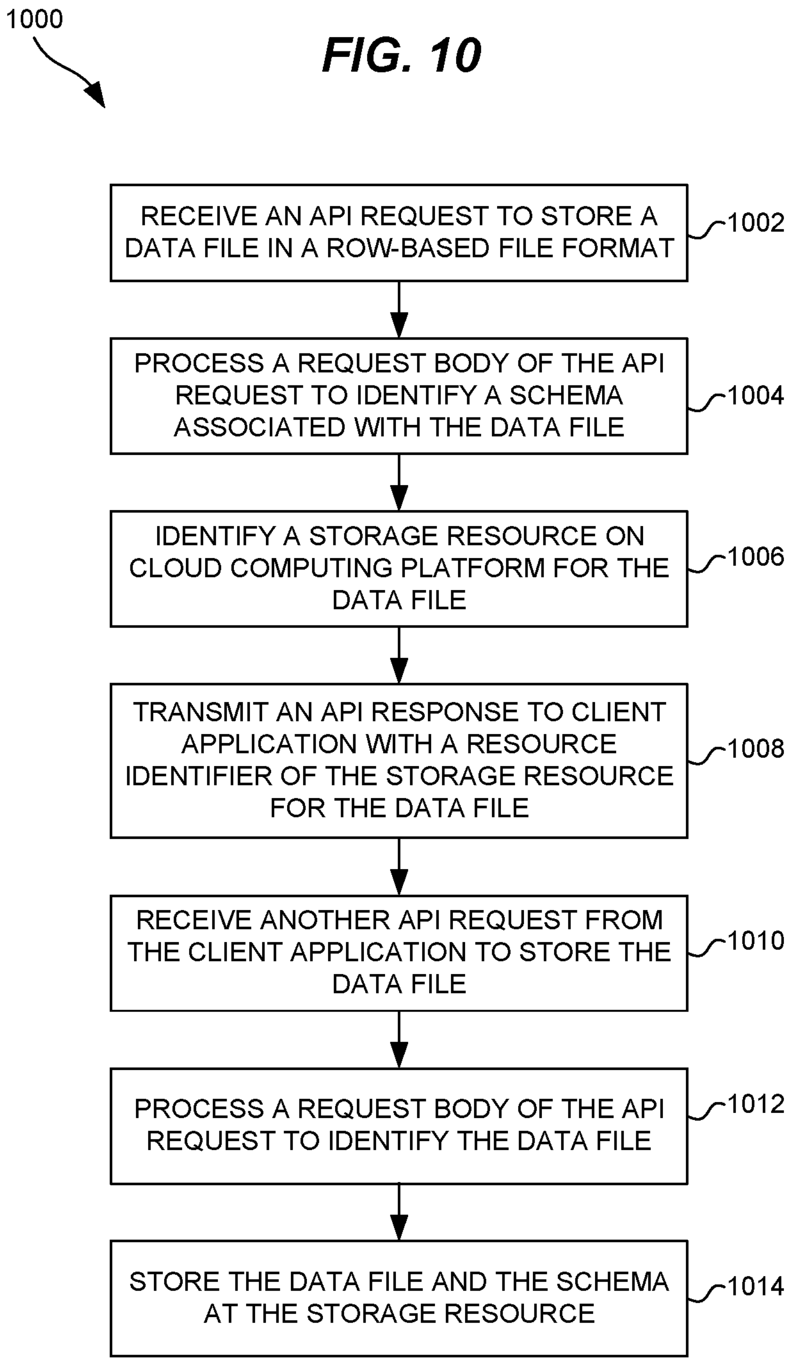
FIG. 10 is a flow chart illustrating a method of providing a data management service in an illustrative embodiment.

FIG. 10 is a flow chart illustrating a method 1000 of providing a data management service 100 in an illustrative embodiment. The steps of method 1000 will be described with reference to data management system 200 in FIG. 2, but those skilled in the art will appreciate that method 1000 may be performed in other systems or devices. Also, the steps of the flow charts described herein are not all inclusive and may include other steps not shown, and the steps may be performed in an alternative order.

The following describes an example of an ingestion phase of a data file 402 into data management service 100. Data collector 202 receives an API request 602 to store a data file 402 in a row-based file format 302 from client application 620 (step 1002), and processes a request body 610 of the API request 602 to identify a schema 406 associated with the data file 402 (step 1004). Data collector 202 provisions or identifies a cloud-based storage resource 420 on cloud computing platform 112 for the data file 402 (step 1006), and transmits an API response 604 to client application 620 with a resource identifier 612 (e.g., URI) of the cloud-based storage resource 420 for the data file 402 (step 1008). At this time, data collector 202 may temporarily store the schema 406 associated with the data file 402. Data collector 202 receives another API request 606 from the client application 620 to store the data file 402 at the cloud-based storage resource 420 (step 1010), and processes a request body 614 of the API request 606 to identify the data file 402 (step 1012). Data collector 202 then stores the data file 402 and the schema 406 at the cloud-based storage resource 420 (step 1014), which is identifiable based on the resource identifier 612. Technical benefits of method 1000 are the schema 406 is uploaded in an API call to the cloud computing platform 112, and stored together with the data file 402 so that other processes may locate and access the schema 406 when processing the data file 402.

In an embodiment, data converter 204 is configured to convert a data file 402 in row-based file format 302 to columnar file format 322 using the schema 406 associated with the data file 402. As described above, the schema 406 associated with the data file 402 indicates column information to construct one or more columns from data in the data file 402. Thus, data converter 204 uses the schema 406 as a template or blueprint to transform the data file 402 into columnar file format 322 with one or more columns 326 specified by the schema 406.

Figure 11:
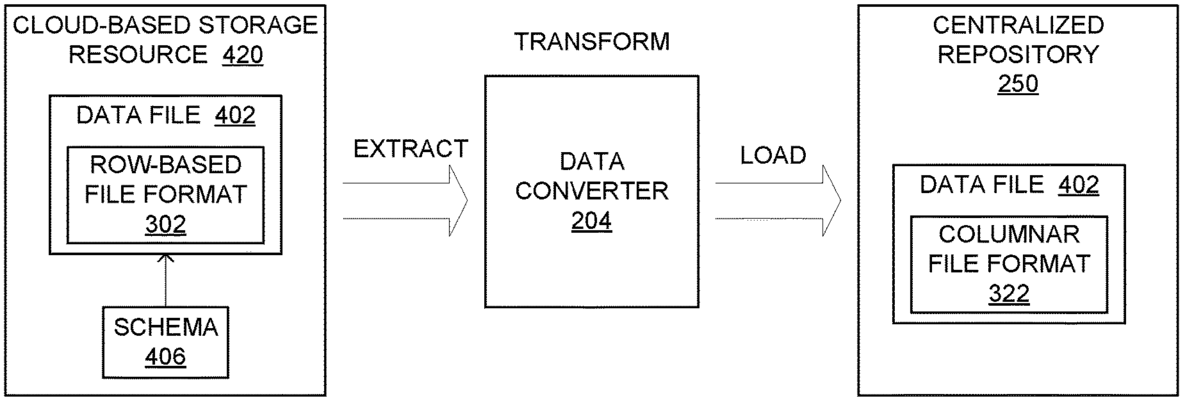
FIG. 11 illustrates a conversion phase of data in a data management service in an illustrative embodiment.

FIG. 11 illustrates a conversion phase of data in the data management service 100 in an illustrative embodiment. In this example, a cloud-based storage resource 420 stores a data file 402 in row-based file format 302 along with a schema 406 associated with the data file 402. For the conversion phase, data converter 204 is configured to extract the data file 402 in row-based file format 302 from cloud-based storage resource 420. For example, data converter 204 may receive a transform job or the like requesting transform of data file 402 into a columnar file format 322. The transform job may point to the memory location of the data file 402. To transform the data file 402, data converter 204 is configured to extract the schema 406 associated with the data file 402. As described above, the schema 406 is specific to the data file 402, and is connected or linked to the data file 402 as stored in cloud-based storage resource 420. Although there may be other schemas available or defined which data converter 204 may access, data converter 204 is programmed to look for the schema 406 ingested or uploaded with the data file 402, and linked to the data file 402 in the cloud-based storage resource 420. Data converter 204 then transforms the data file 402 in row-based file format 302 into a columnar file format 322 based on the schema 406 associated with the data file 402. Data converter 204 loads the data file 402 in columnar file format 322 to centralized repository 250. This processing may be referred to as an extract, transform, and load (ETL) process, which is a type of data integration process that combines data from multiple data sources into a single, consistent data store that is loaded into centralized repository 250. One technical benefit is an organization 400 may specify a schema 406 indicating column information for certain columns of data that are of significance to data analysis, that may be difficult to automatically determine/detect, etc., which is used to convert the data file 402 to columnar file format 322.

Figure 12:
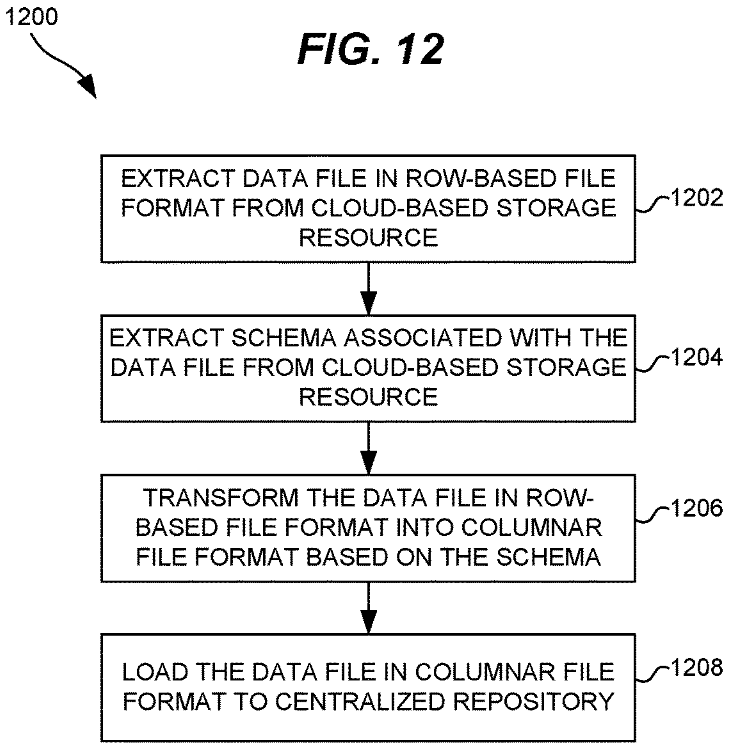
FIG. 12 is a flow chart illustrating a method of providing a data management service in an illustrative embodiment.

FIG. 12 is a flow chart illustrating a method 1200 of providing a data management service 100 in an illustrative embodiment. The steps of method 1200 will be described with reference to data management system 200 in FIG. 2, but those skilled in the art will appreciate that method 1200 may be performed in other systems or devices. The following describes an example of a transformation phase of a data file 402 in data management service 100. With a data file 402 in row-based file format 302 stored in cloud-based storage resource 420, data converter 204 extracts the data file 402 in row-based file format 302 from cloud-based storage resource 420 (step 1202). Data converter 204 also extracts the schema 406 associated with the data file 402 from the same cloud-based storage resource 420 (step 1204). Data converter 204 transforms the data file 402 in row-based file format 302 into a columnar file format 322 based on the schema 406 associated with the data file 402 (step 1206). Data converter 204 then loads the data file 402 in columnar file format 322 to centralized repository 250 (step 1208). One technical benefit of method 1200 is an organization 400 may specify a schema 406 indicating column information for certain columns of data that are of significance to data analysis, that may be difficult to automatically determine/detect, etc., which is used to convert the data file 402 to columnar file format 322.

EXAMPLE

Figure 13:
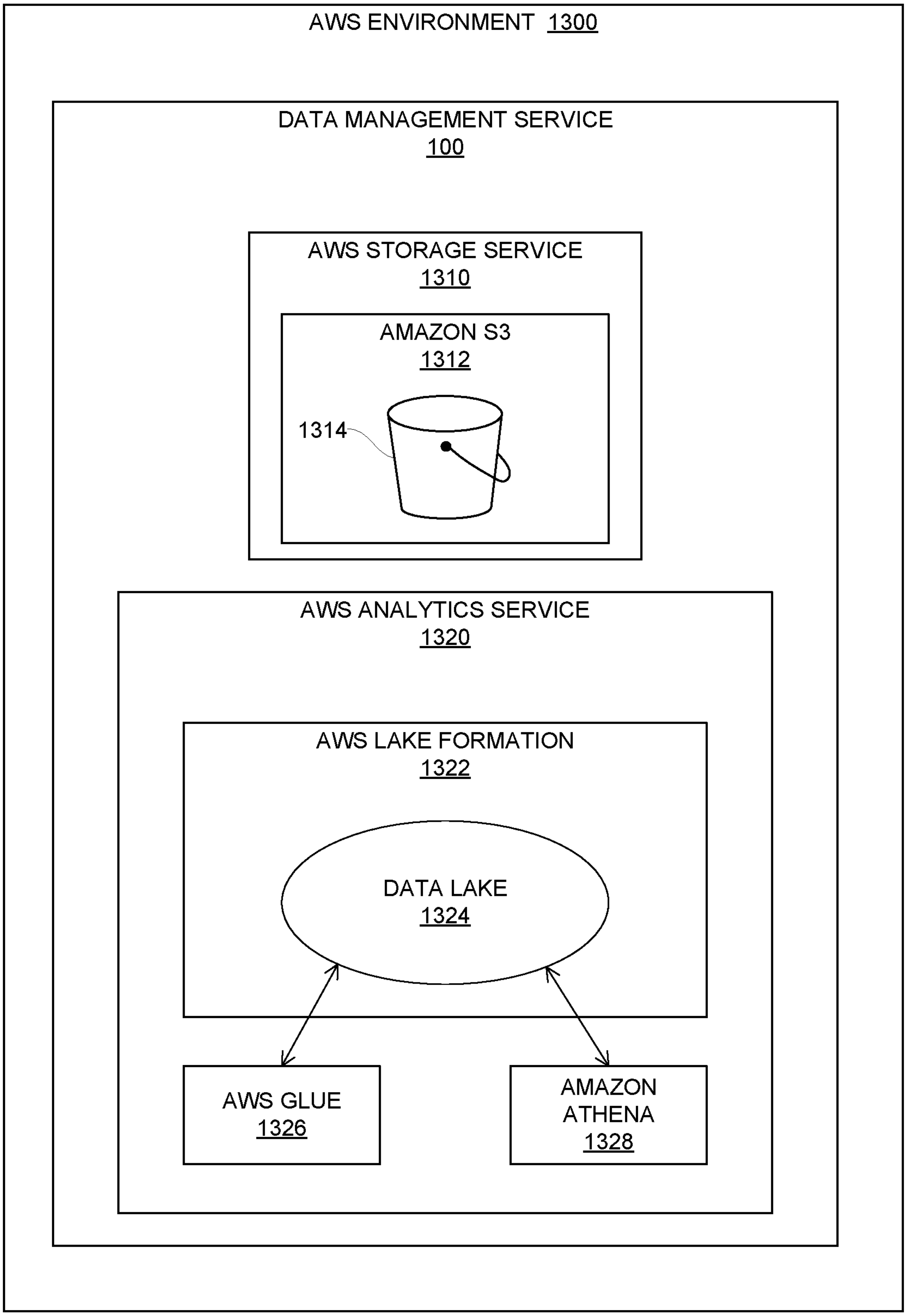
FIG. 13 illustrates a data management service implemented in an AWS environment in an illustrative embodiment.

FIG. 13 illustrates a data management service 100 implemented in an AWS environment 1300 in an illustrative embodiment. AWS is a platform that offers flexible and scalable cloud computing solutions. Thus, AWS environment 1300 comprises an environment that uses an AWS platform or a type of AWS platform (also referred to as an AWS-type environment), such as one that includes future developments of AWS or other Amazon cloud services. The following provides an overview of some services available through the AWS environment 1300. AWS storage services 1310 provide scalable and secure storage for data. One of the AWS storage services 1310 is Amazon Simple Storage Service (Amazon S3) 1312, which is an object storage service. When a data file is uploaded to Amazon S3 1312, the data file is stored as an S3 object in an S3 bucket 1314. An S3 bucket 1314 is a container for objects. An object consists of a file (i.e., the file data) and metadata that describes the file. An unlimited number of objects may be stored in an S3 bucket 1314. A customer creates an S3 bucket 1314, and specifies a bucket name and AWS region. Data is uploaded to that S3 bucket 1314 as objects, and each object has a key (or key name), which is a unique identifier for the S3 object within the S3 bucket 1314.

AWS analytics services 1320 comprise analytics services for data, such as data movement, data storage, log analytics, business intelligence (BI), machine learning (ML), etc. One type of AWS analytics service 1320 is AWS Lake Formation 1322, which creates secure data lakes 1324 making data available for wide-ranging analytics. A data lake 1324 is a centralized repository that allows a customer to store structured and unstructured data. In formation of a data lake 1324, AWS Lake Formation 1322 collects data from multiple data sources, and moves the data into the data lake 1324 in its original format. A data lake 1324 uses Amazon S3 1312 as its primary storage platform.

Another type of AWS analytics services 1320 is AWS Glue 1326, which is a serverless data integration service that discovers, prepares, moves, and integrates data from multiple sources for analytics, machine learning (ML), and application development. AWS Glue 1326 may process data in stored in Amazon S3 1312 when forming a data lake 1324. For example, AWS Glue 1326 may prepare data for analysis through automated extract, transform, and load (ETL) processes. The architecture for AWS Glue 1326 is disclosed in more detail below.

Another type of AWS analytics services 1320 is Amazon Athena 1328, which is a serverless, interactive analytics service that supports open-table and file formats. Amazon Athena 1328 is configured to query data from a variety of data sources (e.g., a data lake), and analyze the data and/or build applications.

Figure 14:
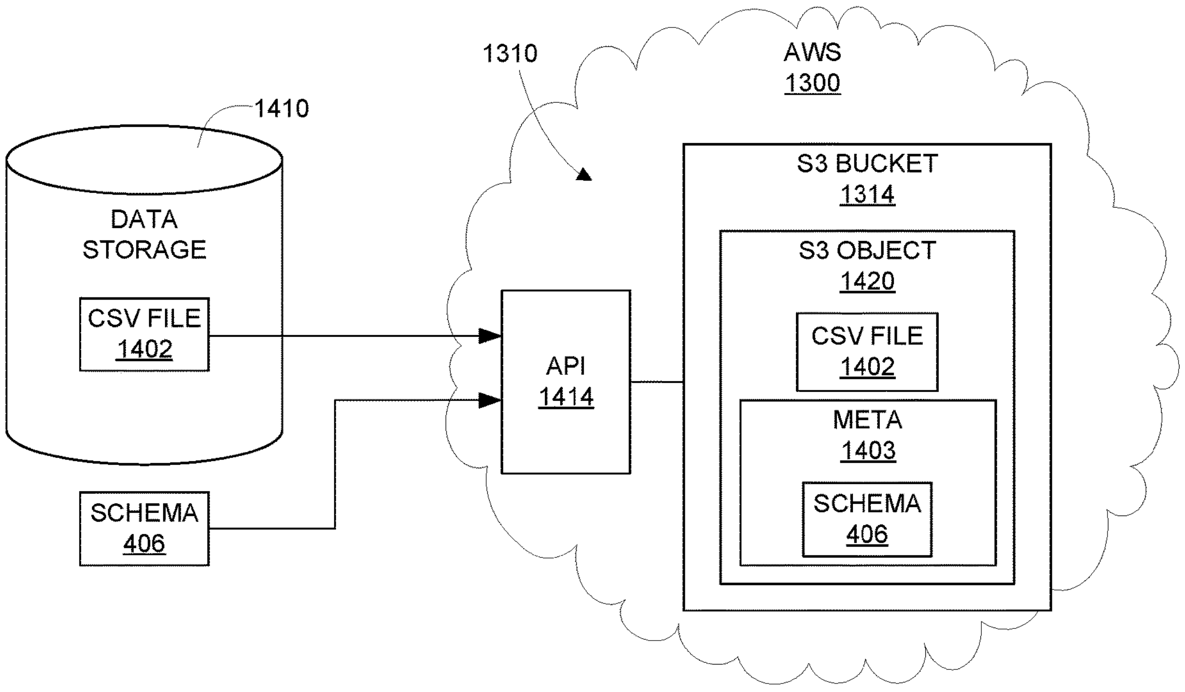
FIG. 14 illustrates data ingestion into an AWS storage service in an illustrative embodiment.

Data management service 100 provides a data ingestion layer responsible for ingesting data into AWS storage services 1310, such as Amazon S3 1312, a data warehouse, etc. FIG. 14 illustrates data ingestion into an AWS storage service 1310 in an illustrative embodiment. In FIG. 14, a data storage 1410 is shown, which may represent a legacy database or another external data storage configured to store data and transfer the data to the cloud for larger consumption and usage. In some cases, the data being exported from data storage 1410 is in CSV file format, as CSV is the only format supported by data storage 1410. Thus, data storage 1410 is shown as storing a CSV file 1402, which is an example of a data file 402 in row-based file format 302 as described above. Although a CSV file 1402 is described in this example, similar concepts apply to other row-based or delimited file formats. The AWS storage service 1310 (e.g., data collector 202) inputs or uploads the CSV file 1402 from data storage 1410. Although one CSV file 1402 is illustrated for an example, it is understood that multiple CSV files 1402 may be stored in data storage 1410, and multiple CSV files 1402 may be transferred or uploaded to the AWS storage service 1310 individually, as a batch, etc.

In general, when a file is uploaded to an AWS storage service 1310, the file may be stored within an S3 bucket 1314 of Amazon S3 1312. More particularly, the file is stored as an S3 object within an S3 bucket 1314. Thus, when uploaded to Amazon S3 1312, for example, the CSV file 1402 is stored as an S3 object 1420 within an S3 bucket 1314. The S3 object 1420 consists of the file data (i.e., CSV file 1402, data file 402, etc.) and metadata 1403 (META) that describes the file data.

The CSV file 1402 may contain headers for data in the file, but does not describe the schema of the data within the CSV file 1402. Thus, a schema 406 is defined for the CSV file 1402, such as by the organization 400 or entity uploading the CSV file 1402. As above, the schema 406 indicates a column structure or column information to construct one or more columns from data in the CSV file 1402. The data ingestion layer of the data management service 100 also allows for uploading of the schema 406 for the CSV file 1402. For example, multiple APIs may be defined in the AWS environment 1300, and an API 1414 used in the data ingestion layer may allow the schema 406 to be uploaded or transferred to an AWS storage service 1310 along with the CSV file 1402, much as described above in FIGS. 6-9. Data ingestion results in CSV file 1402 being loaded or stored as an S3 object 1420 within S3 bucket 1314. Also, schema 406 is loaded or stored with the CSV file 1402 in the S3 object 1420 within the S3 bucket 1314. In an embodiment, the schema 406 is stored as metadata 1403 for the CSV file 1402 in the S3 object 1420. One technical benefit is when an AWS analytics service 1320 (e.g., AWS Glue 1326) accesses the CSV file 1402, the associated schema 406 is located in the same S3 object 1420 as the CSV file 1402.

Multiple CSV files 1402 and associated schemas 406 may be uploaded in a similar manner to S3 bucket 1314 or other AWS storage services 1310. AWS Lake Formation 1322 may then collect the data from S3 bucket 1314 or other AWS storage services 1310, and move the data into the data lake 1324. Although the data such as this has been moved to the data lake, the data in its native format (e.g., CSV) may not be conducive to AWS analytics services 1320. Thus, AWS Lake Formation 1322 may facilitate transformation of the data to another format. For example, AWS Glue 1326 may be used to convert CSV files to another format, such as Parquet. However, other types of file conversion are considered herein.

Figure 15:
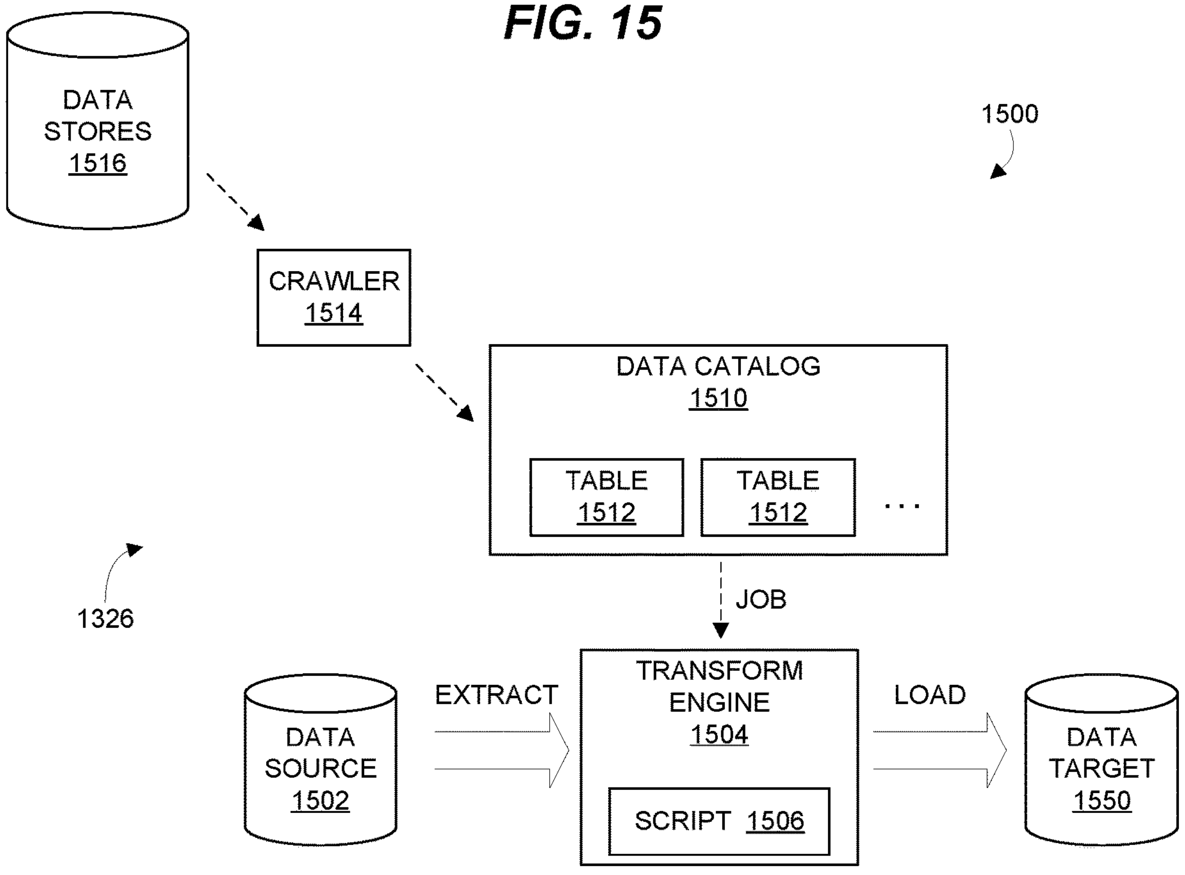
FIG. 15 illustrates an architecture for an AWS Glue service in an illustrative embodiment.

FIG. 15 illustrates an architecture 1500 for the AWS Glue service 1326 in an illustrative embodiment. The AWS Glue service 1326 (also referred to as just AWS Glue) is an example of data converter 204 as described above. The primary data processing functions of AWS Glue 1326 are: data extraction (extract data in a variety of formats), data transformation (reformats data for storage), and data integration (integrate data into data lakes and warehouses). In general, AWS Glue 1326 uses ETL jobs to extract data from a combination of other cloud services offered by AWS, and incorporates the data into data lake 1324 and data warehouses. For example, AWS Glue 1326 extracts data from a data source 1502, which is an AWS storage service 1310 such as Amazon S3 1312, and loads the data to a data target 1550, such as data lake 1324, a data warehouse, etc. Users may put ETL jobs on a schedule or pick events that will trigger a job. When triggered, AWS Glue 1326 extracts the data, transforms the data (e.g., via a transform engine 1504) based on a script 1506, and loads the transformed data into data target 1550. AWS Glue 1326 then writes metadata from the job into the AWS Glue data catalog 1510. The AWS Glue data catalog 1510 is a metadata repository for data assets that contain details, such as table definitions, job definitions, and other control information to manage AWS Glue 1326. The AWS Glue data catalog 1510 is a collection of tables 1512 organized into databases. A table 1512 is a metadata representation of a collection of structured or semi-structured data stored in data stores 1516. A table 1512 in the AWS Glue data catalog 1510 consists of the names of columns, data type definitions, partition information, and other metadata about a dataset. The AWS Glue data catalog 1510 therefore provides a uniform repository where disparate systems can store and find metadata to keep track of data in data stores 1516. The metadata may be used to query and transform the data in a consistent manner across a wide variety of applications.

A general workflow for AWS Glue 1326 is as follows. First, the AWS Glue data catalog 1510 is populated with table definitions. AWS Glue 1326 allows a user to select a crawler 1514, which is a program that connects to a data store 1516 (data source 1502 or data target 1550), progresses through a prioritized list of classifiers to extract metadata, and then creates metadata tables 1512 in the AWS Glue data catalog 1510. A user may also populate the AWS Glue data catalog 1510 with manually-created tables 1512. Next, a user defines a job (e.g., a Glue job, an ETL job, etc.) that describes the transformation of data from the data source 1502 to the data target 1550. To create a job, a user selects a table 1512 from the AWS Glue data catalog 1510, and the job uses this table definition to access the data source 1502 and interpret the format of the data. The user also selects a table 1512 or location from the AWS Glue data catalog 1510 to be the data target 1550 of the job. AWS Glue 1326 uses transform engine 1504 to convert data from a source format to a target format based on script 1506. Transform engine 1504 performs operations such as copy data, rename columns, and filter data to transform the data.

Next, the job is run to transform the data. The job may be run on demand, or start based on a schedule, an event-based trigger, etc. Script 1506 comprises code that extracts data from a data source, transforms the data, and loads the transformed data into a data target. Thus, when the job runs for an ETL operation, script 1506 extracts data from data source 1502 (e.g., a data file), transforms the data, and loads the data to the data target 1550.

Figure 16:
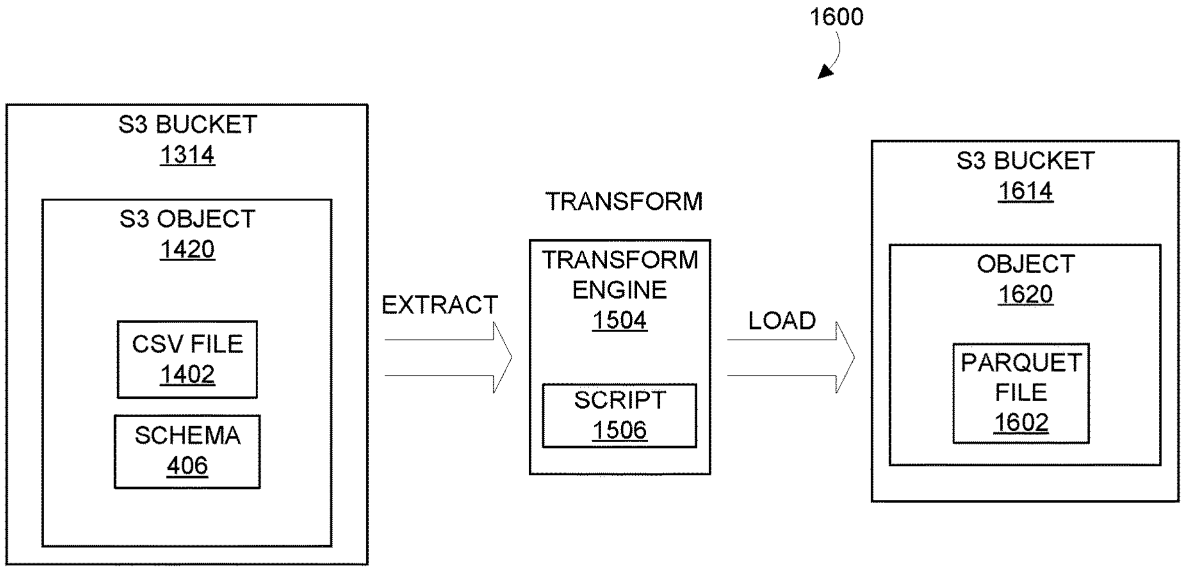
FIG. 16 illustrates an ETL operation in an illustrative embodiment.

FIG. 16 illustrates an ETL operation 1600 in an illustrative embodiment. In this embodiment, the ETL operation 1600 is configured to transform a CSV file 1402 into a Parquet file 1602. As described above, the CSV file 1402 is stored in an S3 bucket 1314, which represents a data source 1502 for the ETL operation. Script 1506 is configured or programmed to extract or pull the CSV file 1402 from S3 bucket 1314. Script 1506 is also configured or programmed to extract or pull the schema 406 associated with the CSV file 1402 from S3 bucket 1314, which is used to transform the CSV file 1402. Whereas a conventional ETL operation through AWS Glue may identify a table 1512 in the AWS Glue data catalog 1510 to transform a file, script 1506 is programmed to pull the schema 406 from the same S3 object 1420 as the CSV file 1402. A crawler 1514 may be ineffective in accurately extracting metadata from a file in row-based file format 302 (e.g., CSV file 1402) if used to create a table 1512 in the AWS Glue data catalog 1510. Thus, in embodiments described herein, the schema 406 is uploaded with the CSV file 1402, and extracted by script 1506 for transformation. One technical benefit is the column information may be accurately defined in the schema 406 for transformation of a data file in row-based file format 302.

Script 1506 is configured to transform or convert the CSV file 1402 into a Parquet file 1602 based on the schema 406 associated with the CSV file 1402. In this example, instead of pulling a table 1512 from AWS Glue data catalog 1510 for transforming CSV file 1402, script 1506 transforms the CSV file 1402 based on the schema 406 uploaded with the CSV file 1402 and stored in the same S3 object 1420. As described above, the schema 406 describes column information to construct one or more columns from data in the CSV file 1402. Thus, script 1506 is able to transform certain data of the CSV file 1402 into columns of the Parquet file 1602 based on the schema 406. One technical benefit is transform engine 1504 is able to accurately define one or more columns of data in Parquet file 1602 based on the schema 406. Script 1506 is further configured to store the Parquet file 1602 in the data target 1550. In the embodiment of FIG. 16, the Parquet file 1602 is stored as an S3 object 1620 in the same or another S3 bucket 1614.

The ETL operation 1600 may perform a similar operation on multiple CSV files 1402 as described above to convert the CSV files 1402 to Parquet files 1602. Thus, the data target 1550 (e.g., data lake 1324) may store many Parquet files 1602 that are available for processing via other AWS services.

Figure 17:
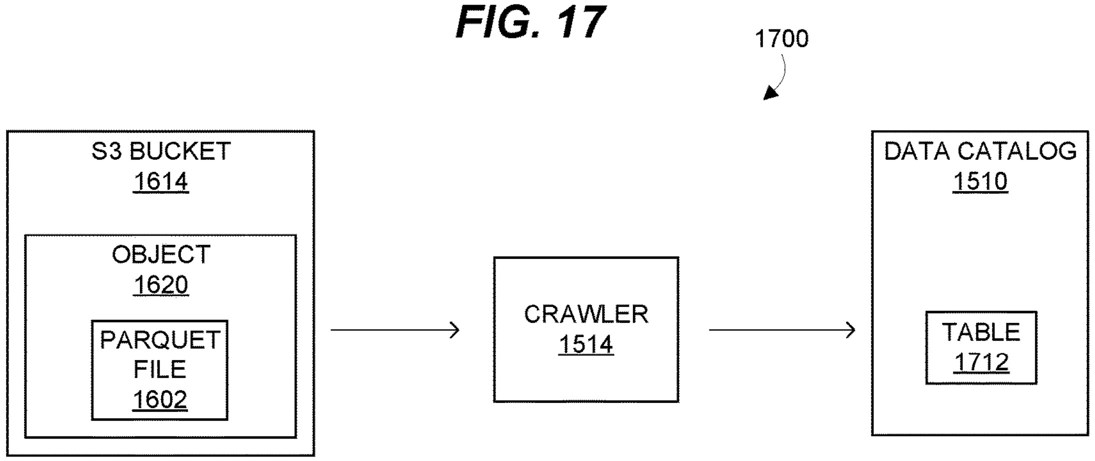
FIG. 17 illustrates a crawler operation in an illustrative embodiment.

After conversion, data management service 100 may run a crawler 1514 of AWS Glue 1326 to create or update a table in AWS Glue data catalog 1510 from the Parquet file 1602. FIG. 17 illustrates a crawler operation 1700 in an illustrative embodiment. In FIG. 17, AWS Glue 1326 runs crawler 1514 on Parquet file 1602 to create or update a table 1712 in AWS Glue data catalog 1510 from the Parquet file 1602. Because schema 406 was defined for the CSV file 1402 and used by transform engine 1504 to generate the Parquet file 1602, the schema 406 is embedded in the Parquet file 1602. Thus, when a crawler 1514 crawls the Parquet file 1602, the table 1712 created or updated in AWS Glue data catalog 1510 accurately represents the schema 406. One technical benefit is data analytics services may access the table 1712 created or updated in AWS Glue data catalog 1510 to accurately analyze the Parquet file 1602.

In an embodiment, AWS Glue 1326 may process the schema status indicator 504 in the schema 406 to determine whether to run the crawler 1514 on the Parquet file 1602. As described above, the schema status indicator 504 is a value, flag, or other indication of whether the schema 406 is new, updated, etc. When the schema 406 is new or updated, AWS Glue 1326 may run the crawler 1514 on the Parquet file 1602. When the schema 406 is not new or updated, AWS Glue 1326 may omit running the crawler 1514 on the Parquet file 1602. One technical benefit is there may be a cost involved in running a crawler 1514, so crawler 1514 is run in instances where a schema 406 new or updated.

Figure 18:
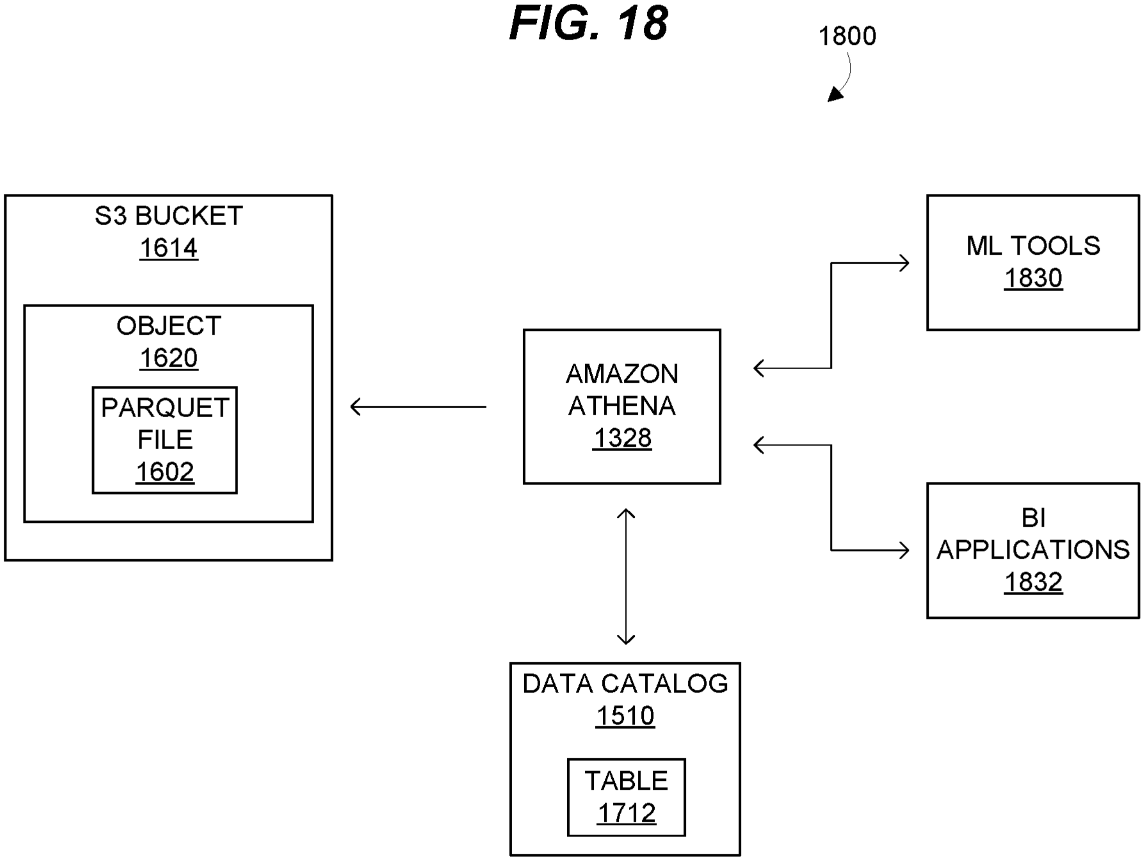
FIG. 18 illustrates data analytics with Amazon Athena in an illustrative embodiment.

FIG. 18 illustrates data analytics 1800 with Amazon Athena 1328 in an illustrative embodiment. Amazon Athena 1328 is an example of data analyzer 206 in FIG. 2, and is an interactive query service to analyze data directly in Amazon S3 1312 using standard Structured Query Language (SQL). The data obtained by Amazon Athena 1328 may be used for MIL tools 1830, Business Intelligence (BI) applications 1832, etc. In an embodiment, Amazon Athena 1328 may access the table 1712 created or updated in AWS Glue data catalog 1510 from the Parquet file 1602 (i.e., by crawling the Parquet file 1602). One technical benefit is Amazon Athena 1328 may query the Parquet file 1602 accurately based on the table 1712 created from the Parquet file 1602.

Figure 19:
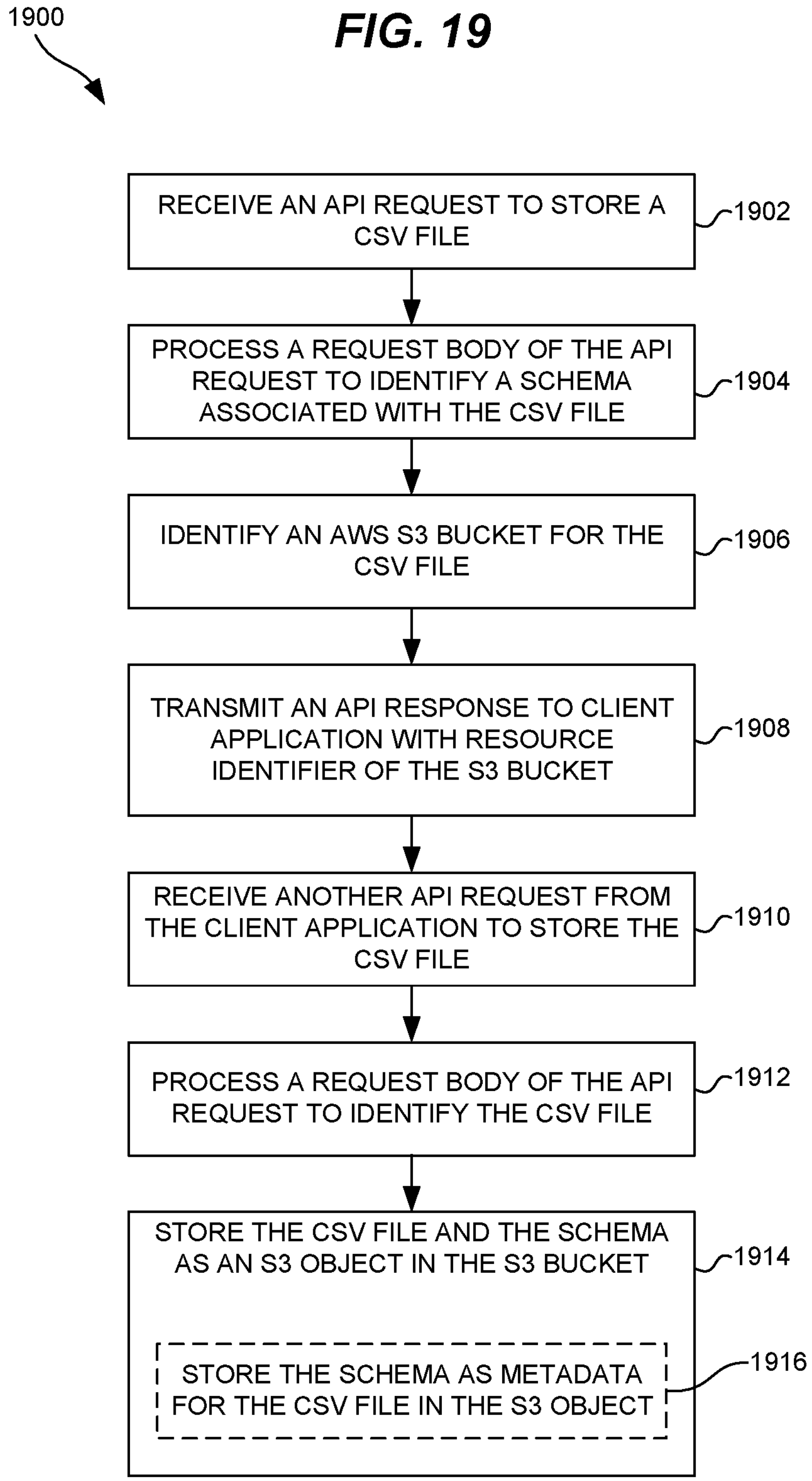
FIGS. 19-21 are flow charts illustrating a method of providing a data management service in an AWS environment in an illustrative embodiment.
Figure 20:
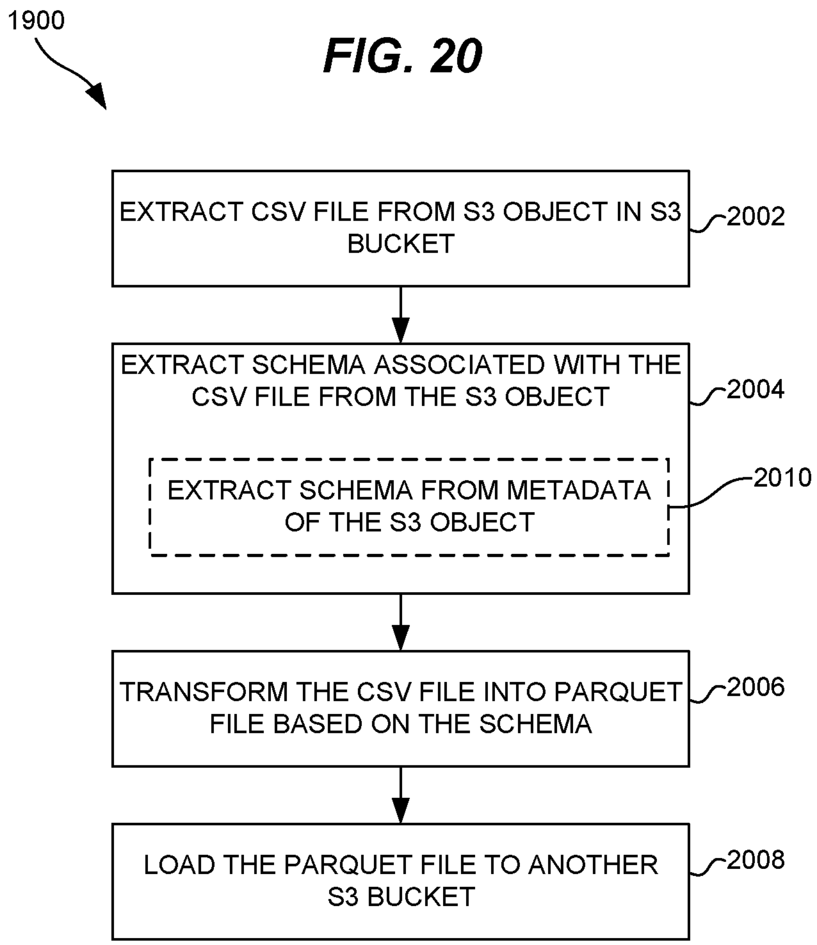
Figure 21:
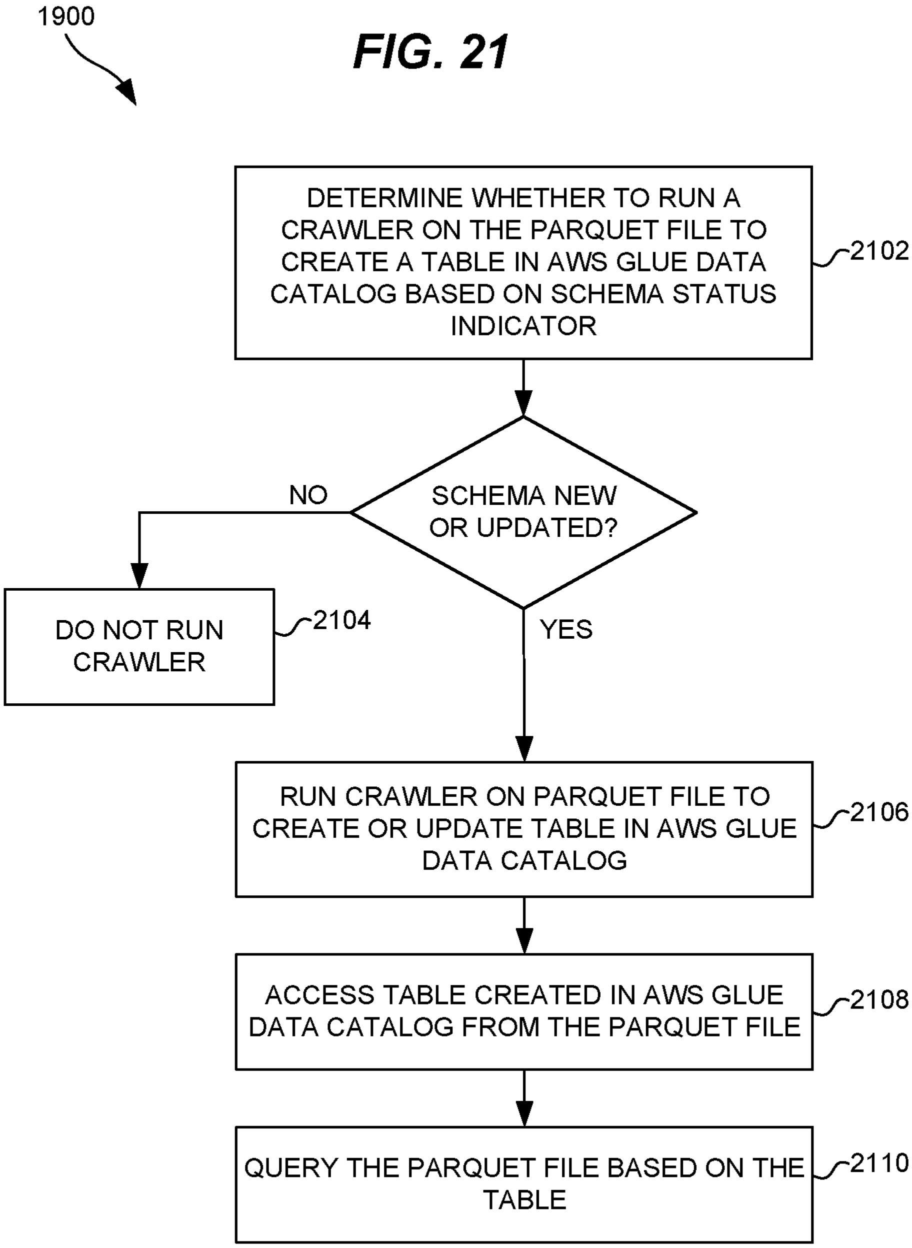

FIGS. 19-21 are flow charts illustrating a method 1900 of providing a data management service 100 in an AWS environment 1300 in an illustrative embodiment. FIG. 19 illustrates an ingestion phase of a CSV file 1402 into data management service 100, however, similar concepts may be applied to data files 402 in other row-based file formats 302. Within the AWS environment 1300, data collector 202 receives an API request 602 from client application 620 (i.e., through API 1414) to store a CSV file 1402 (step 1902), and processes a request body 610 of the API request 602 to identify a schema 406 associated with the CSV file 1402 (step 1904). Data collector 202 provisions or identifies a storage resource (i.e., S3 bucket 1314) in AWS storage service 1310 for the CSV file 1402 (step 1906), and transmits an API response 604 to client application 620 with a resource identifier 612 (e.g., URI) of the S3 bucket 1314 for the CSV file 1402 (step 1908). At this time, data collector 202 may temporarily store the schema 406 associated with the CSV file 1402. Data collector 202 receives another API request 606 from the client application 620 to store the CSV file 1402 at the S3 bucket 1314 (step 1910), and processes a request body 614 of the API request 606 to identify the CSV file 1402 (step 1912). Data collector 202 then stores the CSV file 1402 and the schema 406 as an S3 object 1420 in the S3 bucket 1314 (step 1914). In an embodiment, data collector 202 stores the schema 406 as metadata 1403 for the CSV file 1402 in the S3 object 1420 (optional step 1916).

In FIG. 20, with the CSV file 1402 stored within S3 bucket 1314, data converter 204 (i.e., AWS Glue 1326) extracts the CSV file 1402 from the S3 object 1420 in the S3 bucket 1314 (step 2002), and also extracts the schema 406 associated with the CSV file 1402 from the same S3 object 1420 (step 2004). In an embodiment, data converter 204 (i.e., through script 1506) may be configured or programmed to extract or pull the schema 406 from the metadata 1403 for the CSV file 1402 in the S3 object 1420 of the CSV file 1402 (optional step 2010). Data converter 204 transforms or converts the CSV file 1402 into a Parquet file 1602 based at least on the schema 406 associated with the CSV file 1402 (step 2006). As described above, the schema 406 describes column information to construct one or more columns from data in the CSV file 1402. Thus, script 1506 is able to transform certain data of the CSV file 1402 into columns of the Parquet file 1602 based on the schema 406. Data converter 204 then loads the Parquet file 1602 to the same or another S3 bucket 1614 (step 2008). For example, data converter 204 stores the Parquet file 1602 an S3 object 1620 in another S3 bucket 1614. FIG. 20 illustrates conversion of a CSV file 1402 to a Parquet file 1602, however, similar concepts may be applied to data files 402 in other columnar file formats 322.

In FIG. 21, after generating the Parquet file 1602, data converter 204 determines whether to run a crawler 1514 (i.e., of AWS Glue 1326) on the Parquet file 1602 to create a table 1712 in AWS Glue data catalog 1510 from the Parquet file 1602 (step 2102). More particularly, data converter 204 may process the schema status indicator 504 in the schema 406 to determine whether to run a crawler 1514 on the Parquet file 1602. When the schema status indicator 504 indicates that the schema 406 is not new or updated, data converter 204 may not run crawler 1514 on the Parquet file 1602 (step 2104). When the schema status indicator 504 indicates that the schema 406 is new or updated, data converter 204 runs the crawler 1514 on the Parquet file 1602 to create or update a table 1712 in AWS Glue data catalog 1510 from the Parquet file 1602 (step 2106). Data analyzer 206 (e.g., Amazon Athena 1328) may then access the table 1712 created in AWS Glue data catalog 1510 from the Parquet file 1602 (step 2108), and query the Parquet file 1602 based on the table 1712 (step 2110).

Figure 22:
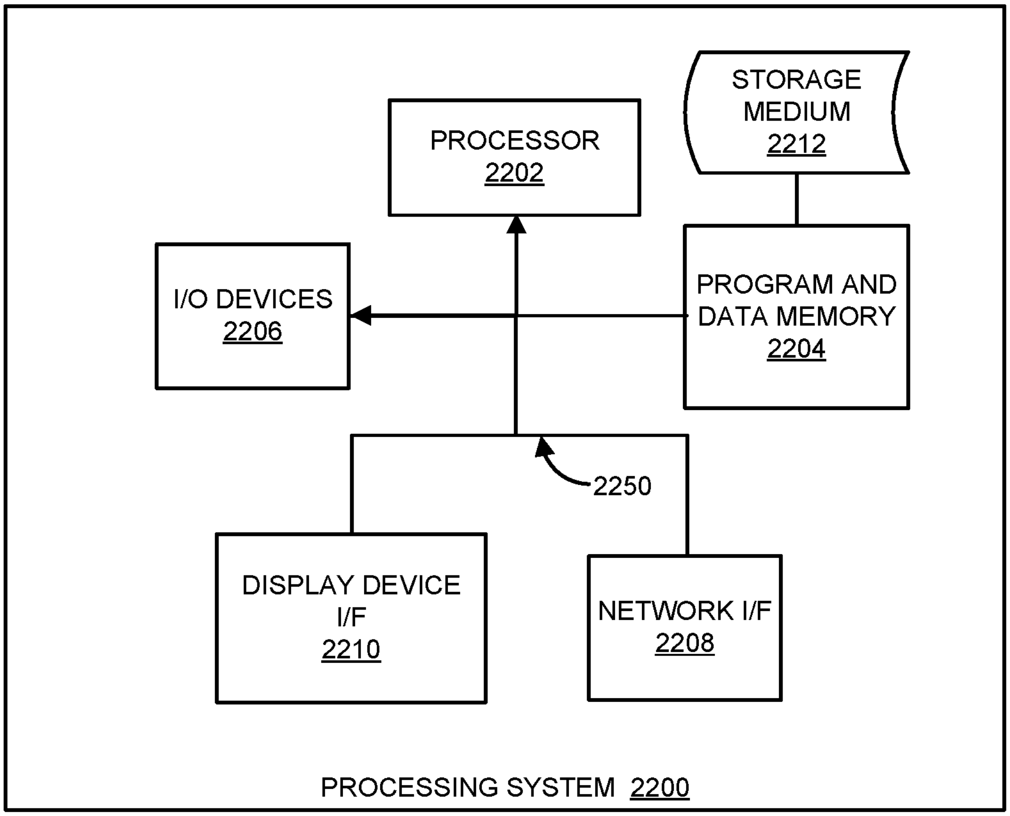
FIG. 22 illustrates a processing system operable to execute a computer readable medium embodying programmed instructions to perform desired functions in an illustrative embodiment.

Embodiments disclosed herein can take the form of software, hardware, firmware, or various combinations thereof. FIG. 22 illustrates a processing system 2200 operable to execute a computer readable medium embodying programmed instructions to perform desired functions in an illustrative embodiment. Processing system 2200 is operable to perform the above operations by executing programmed instructions tangibly embodied on computer readable storage medium 2212. In this regard, embodiments can take the form of a computer program accessible via computer-readable medium 2212 providing program code for use by a computer or any other instruction execution system. For the purposes of this description, computer readable storage medium 2212 can be anything that can contain or store the program for use by the computer.

Computer readable storage medium 2212 can be an electronic, magnetic, optical, electromagnetic, infrared, or semiconductor device. Examples of computer readable storage medium 2212 include a solid-state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 2200, being suitable for storing and/or executing the program code, includes at least one processor 2202 coupled to program and data memory 2204 through a system bus 2250. Program and data memory 2204 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 2206 (including but not limited to keyboards, displays, pointing devices, etc.) can be coupled either directly or through intervening I/O controllers. Network adapter interfaces 2208 may also be integrated with the system to enable processing system 2200 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 2210 may be integrated with the system to interface to one or more display devices, such as printing systems and screens for presentation of data generated by processor 2202.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a data management system comprising processing resources and storage resources provisioned on a cloud computing platform to implement a data management service, the processing resources configured to cause the data management system at least to extract a data file in a row-based file format from a cloud-based storage resource, and extract a schema associated with the data file from the cloud-based storage resource, where the schema indicates column information to construct one or more columns from data in the data file. The processing resources are configured to further cause the data management system at least to transform the data file in the row-based file format into a columnar file format based on the schema, and load the data file in the columnar file format to a cloud-based centralized repository.

Example 2 includes the subject matter of Example 1, where the schema was uploaded to the data management service with the data file.

Example 3 includes the subject matter of Examples 1 and 2, where the row-based file format comprises a delimited file format.

Example 4 includes the subject matter of Examples 1-3, where the columnar file format comprises Apache Parquet file format.

Example 5 includes the subject matter of Examples 1-4, where the cloud computing platform comprises an AWS environment. The processing resources are configured to further cause the data management system at least to extract the data file in the row-based file format from an Amazon S3 object in an S3 bucket, extract the schema from the Amazon S3 object, transform the data file into the columnar file format based on the schema extracted from the Amazon S3 object, and load the data file in the columnar file format to another S3 bucket of the cloud-based centralized repository.

Example 6 includes the subject matter of Examples 1-5, where the processing resources are configured to further cause the data management system at least to extract the schema from metadata of the Amazon S3 object.

Example 7 includes the subject matter of Examples 1-6, where the cloud-based centralized repository comprises a data lake created in the AWS environment.

Example 8 includes the subject matter of Examples 1-7, where the processing resources are configured to further cause the data management system at least to determine whether to run a crawler on the data file in the columnar file format to create or update a table in an AWS Glue data catalog based on a schema status indicator in the schema.

Example 9 includes the subject matter of Examples 1-8, where the processing resources are configured to further cause the data management system at least to run the crawler on the data file in the columnar file format to create or update the table in the AWS Glue data catalog when the schema status indicator indicates that the schema is new or updated.

Example 10 includes the subject matter of Examples 1-9, where the processing resources are configured to further cause the data management system at least to access the table in the AWS Glue data catalog created or updated from the data file in the columnar file format, and query the data file in the columnar file format based on the table.

Some embodiments pertain to Example 11 that includes a method of implementing a data management service on a cloud computing platform. The method comprises extracting a data file in a row-based file format from a cloud-based storage resource, and extracting a schema associated with the data file from the cloud-based storage resource, where the schema indicates column information to construct one or more columns from data in the data file. The method further comprises transforming the data file in the row-based file format into a columnar file format based on the schema, and loading the data file in the columnar file format to a cloud-based centralized repository.

Example 12 includes the subject matter of Example 11, where the schema was uploaded to the data management service with the data file.

Example 13 includes the subject matter of Examples 11 and 12, where the cloud computing platform comprises an AWS environment. Extracting the data file comprises extracting the data file in the row-based file format from an Amazon S3 object in an S3 bucket. Extracting the schema associated with the data file comprises extracting the schema from the Amazon S3 object. Transforming the data file comprises transforming the data file into the columnar file format based on the schema extracted from the Amazon S3 object. Loading the data file comprises loading the data file in the columnar file format to another S3 bucket of the cloud-based centralized repository.

Example 14 includes the subject matter of Examples 11-13, where extracting the schema comprises extracting the schema from metadata of the Amazon S3 object.

Example 15 includes the subject matter of Examples 11-14, further comprising determining whether to run a crawler on the data file in the columnar file format to create or update a table in an AWS Glue data catalog based on a schema status indicator in the schema.

Example 16 includes the subject matter of Examples 11-15, further comprising running the crawler on the data file in the columnar file format to create or update the table in the AWS Glue data catalog when the schema status indicator indicates that the schema is new or updated.

Example 17 includes the subject matter of Examples 11-16, further comprising accessing the table in the AWS Glue data catalog created or updated from the data file in the columnar file format, and querying the data file in the columnar file format based on the table.

Some embodiments pertain to Example 18 that includes a non-transitory computer readable medium embodying programmed instructions executed by a processor, where the instructions direct the processor to implement a method of implementing a data management service on a cloud computing platform. The method comprises extracting a data file in a row-based file format from a cloud-based storage resource, and extracting a schema associated with the data file from the cloud-based storage resource, where the schema indicates column information to construct one or more columns from data in the data file. The method further comprises transforming the data file in the row-based file format into a columnar file format based on the schema, and loading the data file in the columnar file format to a cloud-based centralized repository.

Example 19 includes the subject matter of Example 18, where the schema was uploaded to the data management service with the data file.

Example 20 includes the subject matter of Examples 18 and 19, where the cloud computing platform comprises an AWS environment. Extracting the data file comprises extracting the data file in the row-based file format from an Amazon S3 object in an S3 bucket. Extracting the schema associated with the data file comprises extracting the schema from the Amazon S3 object. Transforming the data file comprises transforming the data file into the columnar file format based on the schema extracted from the Amazon S3 object. Loading the data file comprises loading the data file in the columnar file format to another S3 bucket of the cloud-based centralized repository.

Although specific embodiments were described herein, the scope of the invention is not limited to those specific embodiments. The scope of the invention is defined by the following claims and any equivalents thereof.

What is claimed is:

1. A data management system, comprising:

a processor and memory provisioned on a cloud computing platform to implement a data management service, the processor configured to cause the data management system at least to:

ingest a data file in a row-based file format to the cloud computing platform along with a pre-provisioned schema definition for the data file, wherein the pre-provisioned schema definition indicates column information to construct one or more columns from data in the data file;

store the data file at a cloud-based storage resource along with the pre-provisioned schema definition linked to the data file as stored in the cloud-based storage resource;

perform an extract, transform, and load process to:

extract, in response to a job request, the data file from the cloud-based storage resource;

extract the pre-provisioned schema definition from the cloud-based storage resource that was ingested with the data file and linked to the data file in the cloud-based storage resource;

transform the data file in the row-based file format, based on the pre-provisioned schema definition ingested with the data file, into a columnar file format comprising the one or more columns specified by the pre-provisioned schema definition; and load the data file in the columnar file format to a cloud-based centralized repository; and analyze, with one or more data analysis tools, the data file in the columnar file format transformed based on the pre-provisioned schema definition, that is stored in the cloud-based central repository.

2. The data management system of claim 1, wherein the processor is configured to further cause the data management system at least to:

receive an Application Programming Interface (API) request to store the data file, wherein the API request includes the pre-provisioned schema definition associated with the data file.

3. The data management system of claim 1, wherein:

the row-based file format comprises a delimited file format.

4. The data management system of claim 1, wherein:

the columnar file format comprises Apache Parquet file format.

5. The data management system of claim 1, wherein:

the cloud computing platform comprises an Amazon Web Services (AWS) environment; and the processor is configured to further cause the data management system at least to:

extract the data file in the row-based file format from an Amazon Simple Storage Service (S3) object in an S3 bucket;

extract the pre-provisioned schema definition from the Amazon S3 object as opposed to one or more tables in an AWS Glue data catalog;

transform the data file into the columnar file format based on the pre-provisioned schema definition extracted from the Amazon S3 object; and load the data file in the columnar file format to another S3 bucket of the cloud-based centralized repository.

6. The data management system of claim 5, wherein the processor is configured to further cause the data management system at least to:

extract the pre-provisioned schema definition from metadata of the Amazon S3 object.

7. The data management system of claim 5, wherein the processor is configured to further cause the data management system at least to:

analyze the data file in the columnar file format loaded in the other S3 bucket.

8. The data management system of claim 5, wherein the processor is configured to further cause the data management system at least to:

determine whether to run a crawler on the data file in the columnar file format to create or update a table in the AWS Glue data catalog based on a schema status indicator in the pre-provisioned schema definition.

9. The data management system of claim 8, wherein the processor is configured to further cause the data management system at least to:

run the crawler on the data file in the columnar file format to create or update the table in the AWS Glue data catalog when the schema status indicator indicates that the pre-provisioned schema definition is new or updated.

10. The data management system of claim 9, wherein the processor is configured to further cause the data management system at least to:

access the table in the AWS Glue data catalog created or updated from the data file in the columnar file format;

query the data file in the columnar file format based on the table; and analyze the data of the data file in the columnar file format using at least one of machine learning tools and business intelligence applications.

11. A method of implementing a data management service on a cloud computing platform, the method comprising:

ingesting a data file in a row-based file format to the cloud computing platform along with a pre-provisioned schema definition for the data file, wherein the pre-provisioned schema definition indicates column information to construct one or more columns from data in the data file;

storing the data file at a cloud-based storage resource along with the pre-provisioned schema definition linked to the data file as stored in the cloud-based storage resource;

performing an extract, transform, and load process by:

extracting, in response to a job request, the data file from the cloud-based storage resource;

extracting the pre-provisioned schema definition from the cloud-based storage resource that was ingested with the data file and linked to the data file in the cloud-based storage resource;

transforming the data file in the row-based file format, based on the pre-provisioned schema definition ingested with the data file, into a columnar file format comprising the one or more columns specified by the pre-provisioned schema definition; and loading the data file in the columnar file format to a cloud-based centralized repository; and analyzing, with one or more data analysis tools, the data file in the columnar file format transformed based on the pre-provisioned schema definition, that is stored in the cloud-based central repository.

12. The method of claim 11, wherein:

ingesting the data file comprises receiving an Application Programming Interface (API) request to store the data file, wherein the API request includes the pre-provisioned schema definition associated with the data file.

13. The method of claim 11, wherein:

the cloud computing platform comprises an Amazon Web Services (AWS) environment; and extracting the data file comprises extracting the data file in the row-based file format from an Amazon Simple Storage Service (S3) object in an S3 bucket;

extracting the pre-provisioned schema definition associated with the data file comprises extracting the pre-provisioned schema definition from the Amazon S3 object as opposed to one or more tables in an AWS Glue data catalog;

transforming the data file comprises transforming the data file into the columnar file format based on the pre-provisioned schema definition extracted from the Amazon S3 object; and loading the data file comprises loading the data file in the columnar file format to another S3 bucket of the cloud-based centralized repository.

14. The method of claim 13, wherein extracting the pre-provisioned schema definition comprises:

extracting the pre-provisioned schema definition from metadata of the Amazon S3 object.

15. The method of claim 13, further comprising:

determining whether to run a crawler on the data file in the columnar file format to create or update a table in the AWS Glue data catalog based on a schema status indicator in the pre-provisioned schema definition.

16. The method of claim 15, further comprising:

running the crawler on the data file in the columnar file format to create or update the table in the AWS Glue data catalog when the schema status indicator indicates that the pre-provisioned schema definition is new or updated.

17. The method of claim 16, further comprising:

accessing the table in the AWS Glue data catalog created or updated from the data file in the columnar file format;

querying the data file in the columnar file format based on the table; and analyzing the data of the data file in the columnar file format using at least one of machine learning tools and business intelligence applications.

18. A non-transitory computer readable medium embodying programmed instructions executed by a processor, wherein the instructions direct the processor to implement a method of implementing a data management service on a cloud computing platform, the method comprising:

ingesting a data file in a row-based file format to the cloud computing platform along with a pre-provisioned schema definition for the data file, wherein the pre-provisioned schema definition indicates column information to construct one or more columns from data in the data file;

storing the data file at a cloud-based storage resource along with the pre-provisioned schema definition linked to the data file as stored in the cloud-based storage resource;

performing an extract, transform, and load process by:

extracting, in response to a job request, the data file from the cloud-based storage resource;

extracting the pre-provisioned schema definition from the cloud-based storage resource that was ingested with the data file and linked to the data file in the cloud-based storage resource;

transforming the data file in the row-based file format, based on the pre-provisioned schema definition ingested with the data file, into a columnar file format comprising the one or more columns specified by the pre-provisioned schema definition; and loading the data file in the columnar file format to a cloud-based centralized repository; and analyzing, with one or more data analysis tools, the data file in the columnar file format transformed based on the pre-provisioned schema definition, that is stored in the cloud-based central repository.

19. The non-transitory computer readable medium of claim 18, wherein:

ingesting the data file comprises receiving an Application Programming Interface (API) request to store the data file, wherein the API request includes the pre-provisioned schema definition associated with the data file.

20. The non-transitory computer readable medium of claim 18, wherein:

the cloud computing platform comprises an Amazon Web Services (AWS) environment; and extracting the data file comprises extracting the data file in the row-based file format from an Amazon Simple Storage Service (S3) object in an S3 bucket;

extracting the pre-provisioned schema definition associated with the data file comprises extracting the pre-provisioned schema definition from the Amazon S3 object as opposed to one or more tables in an AWS Glue data catalog;

transforming the data file comprises transforming the data file into the columnar file format based on the pre-provisioned schema definition extracted from the Amazon S3 object; and loading the data file comprises loading the data file in the columnar file format to another S3 bucket of the cloud-based centralized repository.

* * * * *